United States Patent
Pantel

(10) Patent No.: US 9,117,488 B1
(45) Date of Patent: Aug. 25, 2015

(54) METHOD FOR REDUCING WRITE AMPLIFICATION ON A DATA CARRIER WITH OVERLAPPING DATA TRACKS AND DEVICE THEREOF

(71) Applicant: Lothar Pantel, Neckargemuend (DE)

(72) Inventor: Lothar Pantel, Neckargemuend (DE)

(73) Assignee: inodyn NewMedia GmbH, Neckargemuend (DE)

( * ) Notice: Subject to any disclaimer, the term of this patent is extended or adjusted under 35 U.S.C. 154(b) by 0 days.

(21) Appl. No.: 14/635,919

(22) Filed: Mar. 2, 2015

(30) Foreign Application Priority Data

Mar. 4, 2014 (DE) .................... 10 2014 003 205

(51) Int. Cl.
G11B 5/09 (2006.01)
G11B 20/12 (2006.01)

(52) U.S. Cl.
CPC .... *G11B 20/1252* (2013.01); *G11B 2020/1238* (2013.01)

(58) Field of Classification Search
CPC ........... G11B 20/1252; G11B 2020/90; G11B 2220/20; G11B 2020/1238; G11B 5/02; G11B 27/3027; G11B 27/36; G11B 5/012; G11B 5/09

USPC ................ 360/31, 48, 53, 55, 58, 60
See application file for complete search history.

(56) References Cited

U.S. PATENT DOCUMENTS

| | | | |
|---|---|---|---|
| 7,443,625 B2 | 10/2008 | Hamaguchi et al. | |
| 8,223,458 B2 | 7/2012 | Mochizuki et al. | |
| 8,432,633 B2 | 4/2013 | Grobis et al. | |
| 8,699,185 B1 | 4/2014 | Teh et al. | |
| 8,793,431 B2* | 7/2014 | Bandic et al. | 711/113 |
| 2007/0174582 A1 | 7/2007 | Feldman | |
| 2007/0183071 A1 | 8/2007 | Uemura et al. | |
| 2012/0233432 A1 | 9/2012 | Feldman et al. | |
| 2013/0170061 A1 | 7/2013 | Saito et al. | |
| 2014/0006707 A1 | 1/2014 | Bandic et al. | |

\* cited by examiner

*Primary Examiner* — Nabil Hindi

(57) ABSTRACT

A novel symmetrical band is disclosed, which may be used in connection with shingled magnetic recording (SMR) in order to reduce write amplification (read-modify-write). Depending on the embodiment, overlapping data tracks diverge from, or converge to the center of each symmetrical band. Associated guard regions may be located at the center, or at the band boundaries, and are shared such that the excess width of a write element is caught by the guard regions from both sides. A symmetrical band may reduce the maximum write amplification by more than half. A hard disk controller may maintain the number of taken or empty tracks on both sides of each symmetrical band substantially equal at every fill level.

20 Claims, 15 Drawing Sheets

METHOD FOR REDUCING WRITE AMPLIFICATION ON A DATA CARRIER WITH OVERLAPPING DATA TRACKS AND DEVICE THEREOF

CROSS-REFERENCE TO RELATED APPLICATION

This application claims priority from German Patent Application DE 10 2014 003 205.1, filed Mar. 4, 2014, the entire disclosure of which is expressly incorporated herein by reference.

TECHNICAL FIELD

The present invention relates to the field of data storage and, in particular, to efficient write operations in conjunction with storage devices having overlapping data tracks, such as a hard disk drive, operating according to the shingled magnetic recording (SMR) methodology.

BACKGROUND OF THE INVENTION

Common hard disk drives are storage devices comprising disks whose data-carrying surfaces are coated with a magnetic layer. Typically, the disks are positioned atop one another on a disk stack (platters) and rotate around an axis, or spindle. To store data, each disk surface is organized in a plurality of circular, concentric tracks. Groups of concentric tracks placed atop each other in the disk stack are called cylinders. Read/write heads, each containing a read element and a write element, are mounted on an actuator arm and are moved over the spinning disks to a selected track, where the data transfer occurs. The actuator arm is controlled by a hard disk controller, an internal logic responsible for read and write access. A hard disk drive can perform random read and write operations, meaning that small amounts of data are read and written at distributed locations on the various disk surfaces.

Each track on a disk surface is divided into sections, or segments, known as physical sectors. A physical sector, also referred to as a data block or sector data, typically stores a data unit of 512 bytes or 4 KB of user data.

A disk surface may be divided into zones. Zones are regions wherein each track comprises the same number of physical sectors. From the outside inward, the number of physical sectors per track may decrease from zone to zone. This approach is known as zone bit recording.

A computer, or host, accessing a hard disk drive may use logical block addresses (LBAs) in commands to read and write sector data without regard for the actual locations of the physical sectors on the disc surfaces. By means of a hard disk controller the logical block addresses (LBAs) can be mapped to physical block addresses (PBAs) representing the physical locations of sector data. Different mapping techniques for an indirect LBA-to-PBA read and write access are known in the prior art. In some embodiments LBA-to-PBA mapping does not change often. In other embodiments the LBA-to-PBA mapping may change with every write operation, the physical sectors being assigned dynamically.

The storage capacity of a hard disk drive can be increased, inter alia, by reducing the track pitch (i.e., track width) of the concentric tracks on the disk surfaces. This requires a decrease in the size of the read and write elements. However, without new storage technologies, a reduction in the size of the write elements is questionable, as the magnetic field that can be generated is otherwise too small to adequately magnetize the individual bits on the disk surface. A known solution is the shingled magnetic recording methodology, by which a write element writes data tracks in an overlapping fashion. Further information pertaining to shingled magnetic recording (SMR) can be found in U.S. Pat. No. 8,223,458 B2 and U.S. Pat. No. 8,432,633 B2, as well as in patent applications US2013/0170061 A1, US2007/0183071 A1 and US2012/0233432 A1.

With SMR, overlapping data tracks are grouped into bands, which are separated by inter-band gaps, also known as "guard bands," "guard regions," or "guard tracks." Typically, to change the contents of a first track in an already populated band, it is necessary to read out and buffer all subsequent tracks of the band because after updating the data on that first track, rewriting the buffered data up to the next guard region is unavoidable as the wide write element will inevitably overwrite the data of each subsequent track. Due to the sequential and overlapping structure of SMR, even a small change to the contents stored in a band can result in a significant increase in the amount of data that must be read and written, thus leading to significant delays. Such a process is referred to as "read-modify-write" or "write amplification."

Workloads such as databases often generate random write operations characterized by ongoing updates of small data blocks. These are the most expensive operations within an SMR storage system due to their significant write amplification, which negatively impacts performance. Moreover, increasing file and data fragmentation can slow an SMR hard disk drive much more than it can a conventional hard-disk drive. For these reasons, SMR hard disk drives are primarily intended for cold-storage applications, that is, for scenarios in which data are rarely altered. In the prior art SMR hard disk drives are deemed unsuitable as equal, universal substitutes for conventional hard disk drives.

Known solutions for reducing write-amplification have their disadvantages. One option is to buffer the data of incoming write commands and write the data in larger, contiguous blocks at a later stage. This only works as long as the average data throughput of the collected random write operations is sufficiently low. If the required data throughput is permanently too high for the low write performance of an SMR hard disk drive, even a large buffer will run over, leading to a drastic drop in performance. Furthermore, depending on the design, an additional and/or larger buffer, e.g., flash memory, can increase the production costs of an SMR hard disk drive.

Other known approaches for reducing write amplification include garbage collection, as is also used in solid state disks (SSDs). In contrast to conventional hard disk drives, the association between logical block addresses (LBAs) and physical block addresses (PBAs) is entirely mutable. A translation layer provides a link between LBAs and PBAs. The garbage collection may perform an internal "scrubbing" or other housekeeping tasks from time to time by moving data internally.

U.S. Pat. No. 7,443,625 B2, entitled "Magnetic disk drive," describes a process that uses a "shift address table". An internal "scrubbing" takes place at regular intervals during which the table is "cleaned up." Patent application US2007/0174582 A1, entitled "Mutable association of a set of logical block addresses to a band of physical storage blocks," describes how to reduce write amplification by means of mutable mapping between logical block addresses and physical sectors. During regular operation stored data can be moved to a different physical location, thereby changing the LBA-to-PBA association. A map or table is used to maintain the allocation or association status of each physical sector. The disclosure of this patent application is hereby incorporated by reference in its entirety.

SUMMARY OF THE INVENTION

Aspects of the present disclosure are directed to storage devices with at least one data carrier surface and at least one write element whose data track width exceeds the track width of a read element by an excess width, such as a hard disk drive operating according to the shingled magnetic recording methodology.

A novel symmetrical band is disclosed, which may reduce write amplification. Depending on the embodiment, overlapping data tracks diverge from, or converge to the center of each symmetrical band, establishing overlaps in opposite radial directions within each symmetrical band. Associated guard regions may be located at the center, near the center, or at the band boundaries, and are shared such that the excess width of the write element is caught by the guard regions from both sides.

Symmetrical bands may reduce write amplification, as the number of tracks that must be updated via read-modify-write typically is at least halved. A control unit, e.g., a hard disk controller, may maintain the number of taken or empty tracks on both sides of each symmetrical band substantially equal at every fill level of each symmetrical band.

The aforementioned and many further aspects, variants, objectives, and advantages of the invention will be comprehensible to those skilled in the art after reading detailed descriptions of the embodiments.

BRIEF DESCRIPTION OF THE DRAWINGS

Further features, advantages, and potential applications will be apparent from the drawings. All described and/or illustrated features, alone or in any combination, independent of the synopsis in individual claims, constitute the subject matter of the invention.

DETAILED DESCRIPTION OF THE INVENTION

Figure 1:
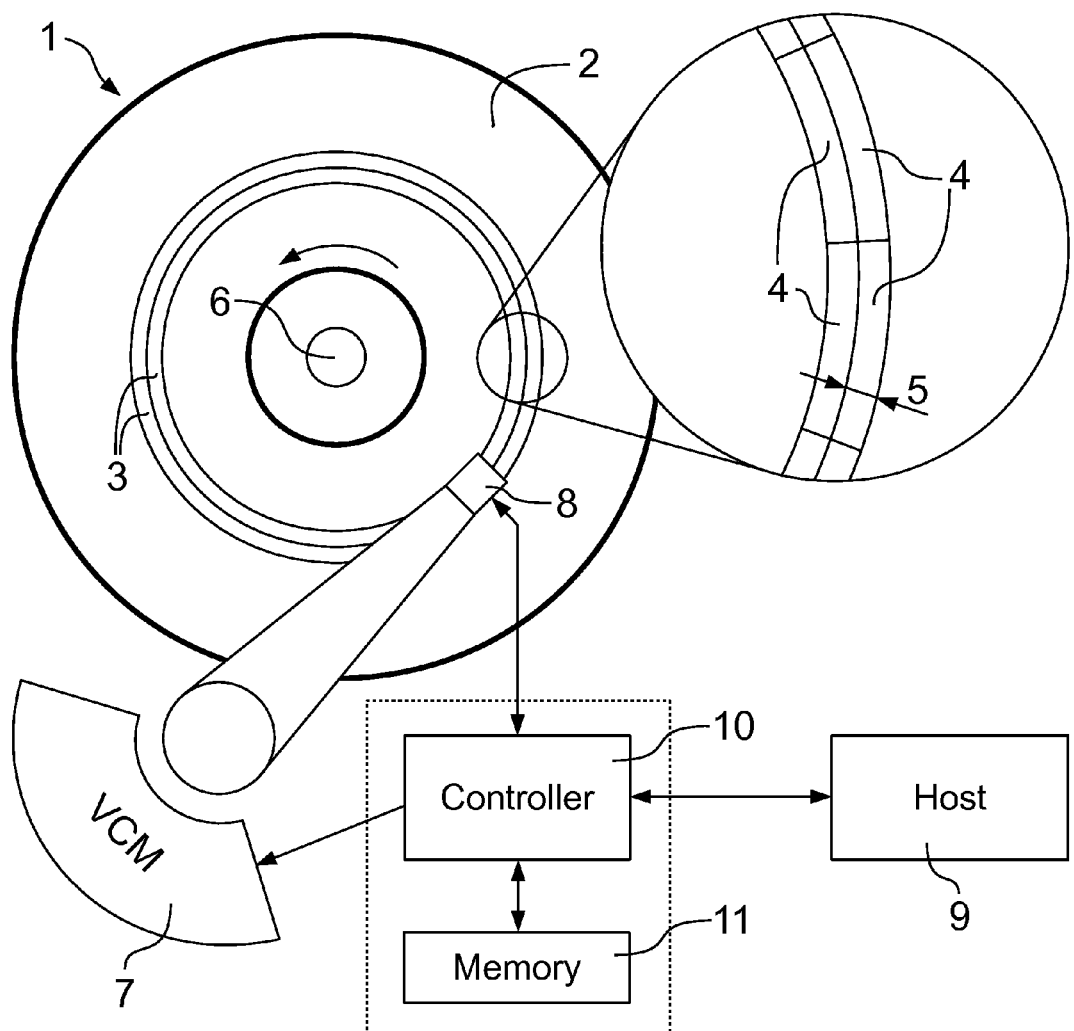
FIG. 1 shows a hard disk drive.

FIG. 1 shows a SMR hard disk drive 1 as an example of a storage device. The disks, with magnetic layers on their disk surfaces 2, spin around the rotational axis of the spindle 6, upon which the individual disks are mounted. Tracks 3 on the disk surfaces 2 are divided into sections, or segments, referred to herein as physical sectors 4, or sectors 4.

To perform read and write operations, the read/write heads 8 are shifted by an actuator arm to the desired track 3. The actuator arm is moved by an actuator 7, typically a voice coil motor (VCM). The actuator 7 is controlled by a hard disk controller 10. The hard disk controller 10 communicates with a host system 9 and has access to a memory, or cache 11. The memory, or cache 11 may, inter alia, buffer data of tracks 3 or sectors 4.

Figure 2:
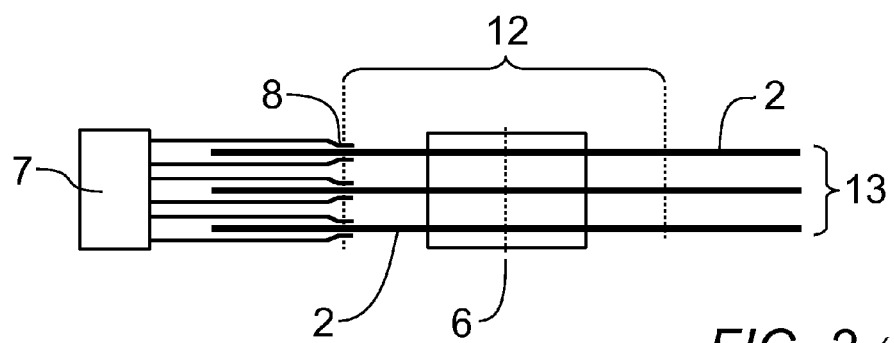
FIG. 2 illustrates the disk stack of the hard disk drive in profile.

FIG. 2 shows a side view of a disk stack 13 (platters), which in this example, comprises three disks, or six disk surfaces 2, as each disk, having upper and lower sides, has two magnetic layers. Cylinder 12 encompasses all concentric tracks 3 that are atop each other in the disk stack 13.

A host system 9, which accesses the SMR hard disk drive 1, may use logical block addresses (LBAs) in commands to read and write sector data without regard for the actual locations of the physical sectors 4 on the disc surfaces 2. LBAs may be mapped to physical block addresses (PBAs) representing the physical sectors 4, that is, the host system 9 may target a specific physical sector 4 using a sequential LBA number, and the conversion to the physical location (cylinder/head/sector) may be performed by the hard disk controller 10. In this process, the geometry of the SMR hard disk drive 1 must be taken into account, such as zones (zone bit recording) and the number of disc surfaces 2.

Different mapping techniques for such an indirect read and write access are known in the prior art. In some embodiments, LBA-to-PBA mapping does not change often. In other embodiments, LBA-to-PBA mapping may change with every write operation as the physical sectors 4 are assigned dynamically. For instance, patent application US2007/0174582 A1, mentioned above, describes such a dynamic association. It is to be explicitly noted that embodiments of the present invention can be implemented using any type of mapping technique, including, but not limited to, dynamic or mutable association of logical block addresses to physical sectors 4.

For shingled magnetic recording, the tracks 3 on the disk surfaces 2 are grouped in bands 15. This is demonstrated in FIG. 3, which shows an enlarged, sectional view of a conventional band 15, comprising eight tracks 3. In the present disclosure, the tracks 3 are numbered by means of track numbers according to the scheme "track #101," "track #102," "track #103," etc. The band 15, consisting of tracks 3 from track #101 through track #108, can be located at any suitable position on a disk surface 2.

The read/write head 8 comprises a write element 16 and a read element 17. In accordance with the principle of shingled magnetic recording, the width of the write element 16 exceeds the width of the read element 17 by an excess width 18. In the particular example, as per FIG. 3, the write element 16 is twice as wide as the read element 17. The arrow 19 indicates the relative direction of motion of the read/write head 8. The write element 16 writes overlapping data tracks 20, which are depicted with a pattern. For illustrative purposes, two different patterns are used to make the overlapping data tracks 20 more distinguishable. Moreover, in the drawings, the sectional view of the data tracks 20 is shown slightly offset along the writing direction 19 so that the overlapping structure is visible. Actual data tracks 20 continue in both directions along their respective tracks 3.

Typically, in order to fill a band 15 with data, the write element 16 starts at track #101, that is, the wide write element 16 is positioned on track pair (#101, #102). Next, to get overlapping data tracks 20, the write element 16 is positioned on track pair (#102, #103), etc. By overlapping the data tracks 20, the resulting track width 5 is halved in this case.

Figure 3:
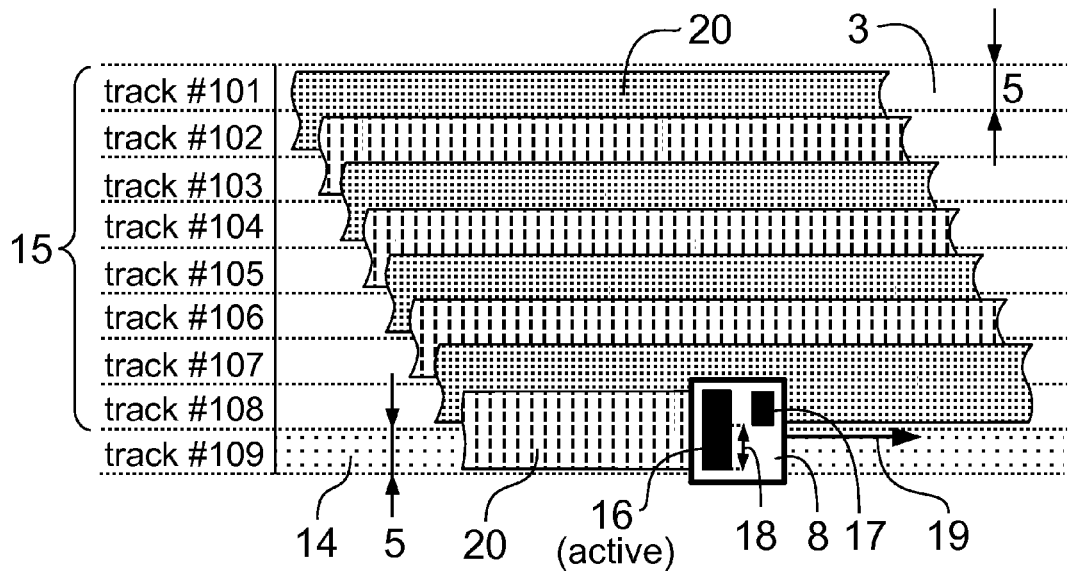
FIG. 3 is an illustration of a conventional band with overlapping data tracks.

Individual bands 15 are separated by inter-band gaps, referred to herein as guard regions 14. FIG. 3 shows a guard region 14 on track #109, marked with a dot pattern. In the illustrated configuration, the guard region 14 occupies a single track 3, referred to herein as a guard track 14. In other embodiments, depending on the excess width 18 of the write element 16, the width of the guard region 14 may also be greater, for example, a multiple of the track width 5.

The guard track 14 is required to close off and delimit the band 15 so that the wide write element 16 does not overwrite any tracks 3 of a subsequent band 15. For instance, to write data on track #108, as shown in FIG. 3, the wide write element 16 is positioned on track pair (#108, #109).

Those skilled in the art will recognize that, if data on the first track 3 of the band 15 (track #101) are to be altered or rewritten, the data on all subsequent tracks 3 up to the guard track 14 must first be read and buffered at a temporary location or in a memory or cache 11, and must finally be rewritten, as the contents of each subsequent track 3 will be destroyed during the writing process. This is referred to as read-modify-write or write amplification.

The definition of track width 5 in shingled magnetic recording, as used in the present disclosure, is based on the width of the remaining readable data track 20 after overlapping with an adjacent data track 20. This remaining readable data track 20 constitutes the track 3 for which the read element 17 is designed or optimized.

Physical sectors 4 are sections of a track 3. The terms "sector" and "track" are therefore closely related technically and, depending on the desired embodiment, often equally applicable. Commonly, the umbrella term "track" is also representative of a portion of the track 3 under consideration. Whenever a track 3 is mentioned in the present disclosure, it can also refer to a physical sector 4 that is situated on it. Conversely, if the term "physical sector" is mentioned, the relevant operation may alternatively be applied to the entire track 3, or larger parts of the track 3.

The terms "track" (or "track number") and "cylinder" (or "cylinder number") are likewise closely related technically. Whenever a process is said to take place on a track 3, this may also concern the associated cylinder 12. Conversely, if the term "cylinder" is mentioned, this may imply involvement of at least one of the tracks 3 on the specified cylinder 12.

If a track 3 or band 15, 21, 22 is referred to as "preceding," "above," "upwards," or at an "upper" location, what is meant is that this track 3 or band 15, 21, 22 may be located farther outside on the disk surface 2 and/or may have a smaller track or cylinder number. If a track 3 or band 15, 21, 22 is "succeeding," "below," "downwards," or at a "lower" location, this track 3 or band 15, 21, 22 may be located farther inside on the disk surface 2 and/or may have a greater track or cylinder number. Depending on the embodiment, a reverse orientation (e.g., farther inside instead of farther outside) or a numbering of the tracks 3 and cylinders 12 in the opposite direction may also apply.

In the present disclosure, the term "guard region" is used as an umbrella term for "guard track." A guard track is defined as a guard region consisting of one track 3. As a general term, a guard region may consist of just one track 3 or more than one track 3. Depending on the embodiment, a guard region or guard track may be defined as an integral part of the band 21 or may be defined as a separate instance between two bands 15, 22.

Figure 4:
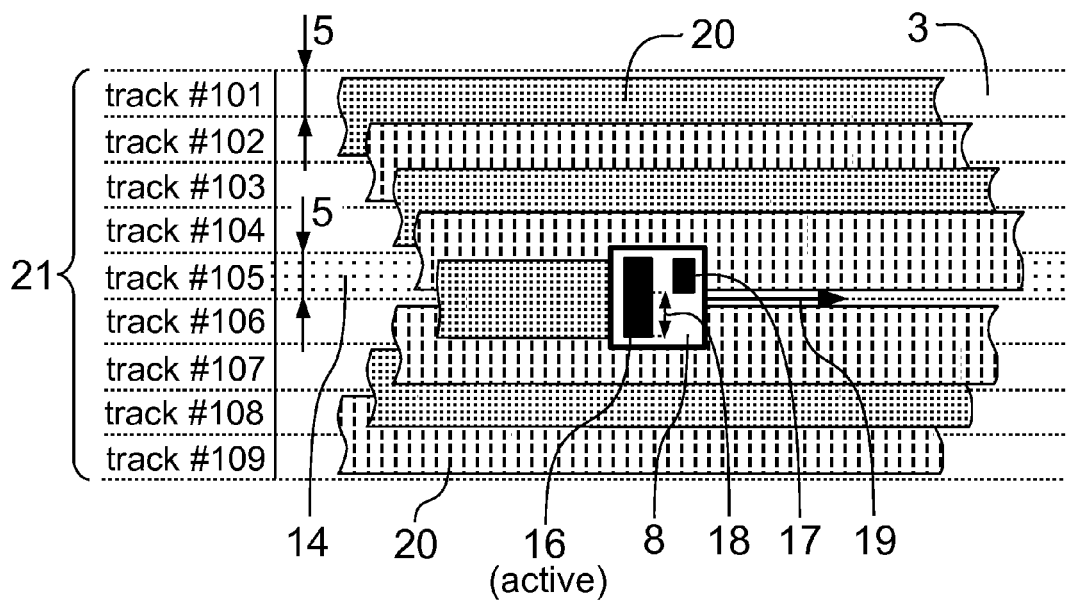
FIG. 4 shows a symmetrical band whose guard region is located in the middle of the band. (first embodiment)
Figure 5:
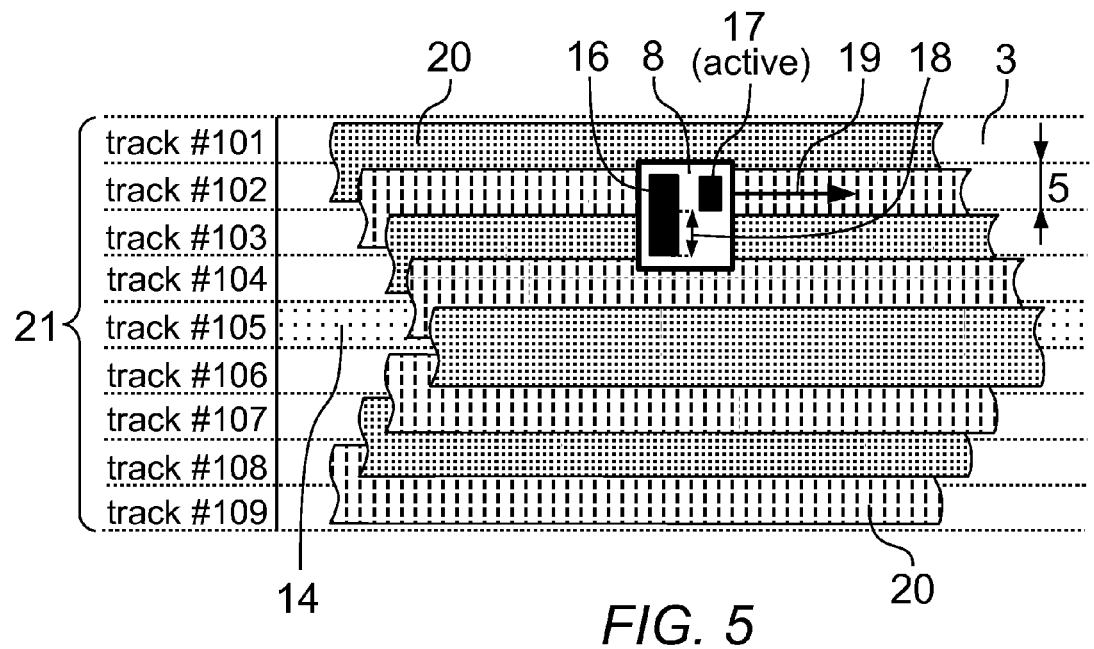
FIG. 5 illustrates how to read data from a track in the symmetrical band. (first embodiment)

FIG. 4 and FIG. 5 show a first embodiment, introducing a novel band type for shingled magnetic recording, referred to herein as a symmetrical band 21. A symmetrical band 21 differs from a conventional band 15 in the position of the guard region 14, which is located in or near the middle of the band 21. For structural reasons, the guard region 14 in this case is defined as an integral part of the band 21. A plurality of symmetrical bands 21 can be arranged side-by-side without necessitating an additional gap exist between the band boundaries.

In the specific example shown in FIG. 4 the read/write head 8 and the number of tracks 3 per band 21 correspond to the previous example of a conventional band 15, that is, the write element 16 writes data tracks 20 that are twice as wide as the underlying track width 5, and the band 21 contains eight tracks 3 that can be used to store data. However, in this case, the guard track 14 is located on track #105 and, thus, in the middle of the band 21.

In the case of a symmetrical band 21, the overlapping data tracks 20 may be written on both sides of the band 21, from the outside inward. This results in overlaps in opposite radial directions, symmetrically to the guard region 14. In FIG. 4, the overlapping data tracks 20 show the order in which the individual tracks 3 in the band 21 may be written by the write element 16 to fill the band 21 with data. By way of example, track #101 at the upper band boundary may be written first; next, track #109 at the lower band boundary, then track #102 in the upper half of the band 21, then track #108 in the lower half of the band 21, etc.

The excess width 18 of the write element 16 should always be positioned toward the center of the band 21 so that outer tracks 3 of the band 21, which may already contain valid data, are not overwritten. When writing data on the two innermost tracks 3 of the band 21 (tracks #104 and #106 as per FIG. 4), it is crucial that the write element 16 be positioned such that the excess width 18 is caught by the guard region 14 in both cases. In contrast to that of a conventional band 15 (as per FIG. 3), the guard region 14 of a symmetrical band 21 (as per FIG. 4) is used from both sides of the band 21, that is, the two innermost tracks 3 of the band 21 share a common guard region 14.

In this context, the term "excess width 18 of write element 16" is to be interpreted regardless of the position of the read element 17 within the read/write head 8 and regardless of the corresponding arrow 18 depicted in FIG. 4. E.g., the excess width 18 may be located on either sides of the write element 16, depending on whether the write element 16 writes to a track 3 in the upper or lower half of a band 21.

With continued reference to the situation depicted in FIG. 4, a data track 20 with valid data has been written to track pair (#104, #105) by the wide write element 16. However, since the contents of the guard track 14 on track #105 are irrelevant, the guard track 14 can be overwritten while writing new data on the lower adjacent track #106, that is, the write element 16 is positioned on track pair (#105, #106), as shown in the drawing.

Compared with the conventional arrangement of tracks 3 in a band 15 (as per FIG. 3), the symmetrical arrangement (as per FIG. 4) reduces the maximum write amplification by more than half. E.g., if data are to be changed on the first track 3 (track #101) of the band 21, data of merely three additional tracks 3 need to be read and rewritten, rather than of seven additional tracks 3. This results in significantly reducing the time required to update data in a full band 21. The average transfer rate for random write operations is therefore increased.

FIG. 5 shows by way of example how track #102 can be read from a full symmetrical band 21. The read/write head 8 is positioned so that the active read element 17 is located on track #102. The relative direction of motion of the read/write head 8 is indicated with an arrow 19. The read element 17 fits to the width of the tracks 3, i.e., the read element 17 is designed and optimized for the track width 5. This also applies to the effective width of the write element 16, which is designed to write data tracks 20 that are twice the track width 5.

Figure 6:
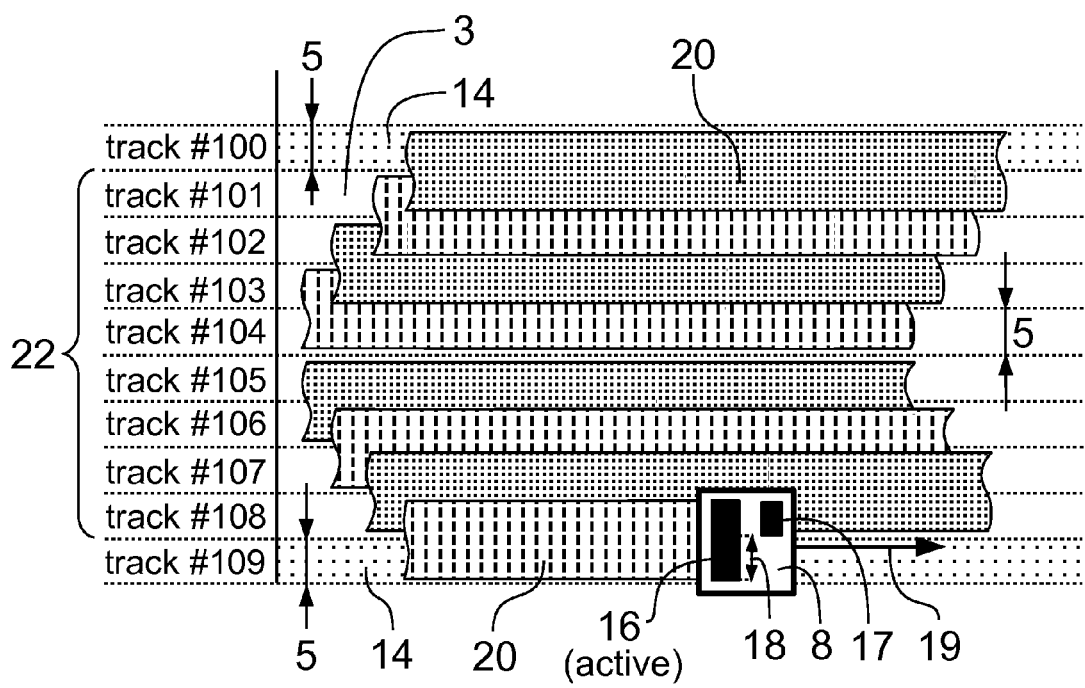
FIG. 6 shows a symmetrical band whose guard regions are located at the band boundaries. (second embodiment)

The symmetrical overlaps of data tracks 20 within a band 21 may also be arranged in the opposite direction. In this case, the overlapping data tracks 20 may diverge in the middle of the band 22 or at a location near the middle, and the guard regions 14 may be located at the upper and lower band boundaries. This second embodiment is illustrated in FIG. 6. Here, the overlapping data tracks 20 diverge between tracks #104 and #105 and the guard tracks 14 are located at the band boundaries on track #100 and #109. In this context, the guard regions or guard tracks 14 are defined as separate instances and are not embedded within the band 22, as each guard region or guard track 14 may also be used by an adjacent band 22.

To fill the band 22 with data, overlapping data tracks 20 may be written by the wide write element 16 on both sides of the symmetrical band 22 from the inside out. This may result in overlaps in opposite radial directions, symmetrical to the center of the band 22. By way of example, as per FIG. 6, track #104 just above the middle of the band 22 may be written first; next, track #105 just below the middle of the band 22, then track #103 in the upper half of the band 22, then track #106 in the lower half of the band 22, etc. The excess width 18 of the write element 16 should always be positioned toward the outside of the band 22, that is, toward the guard regions 14, so that the inner tracks 3 of the band 22, which may already contain valid data, are not overwritten.

Figure 7:
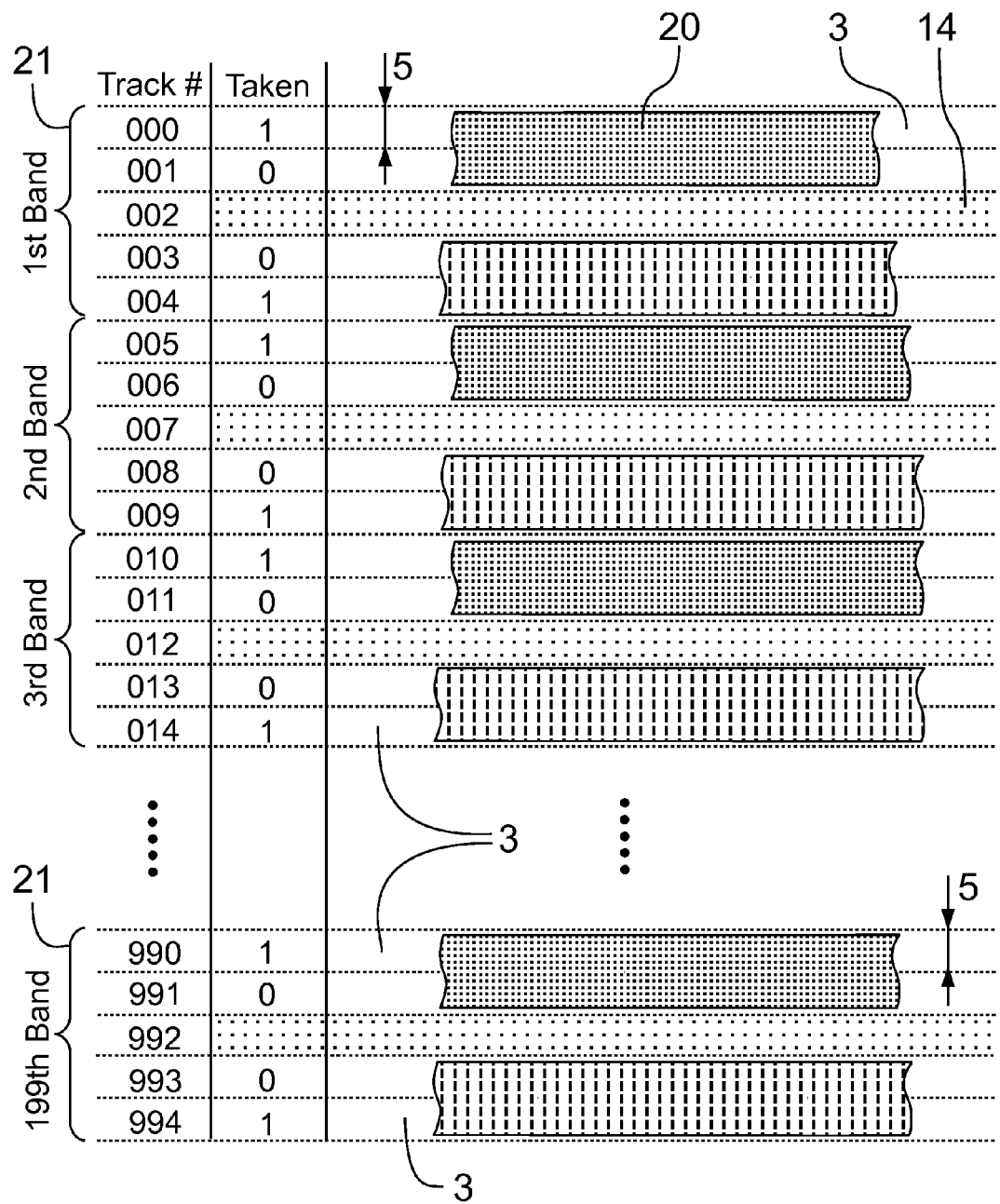
FIG. 7 shows the end of a first filling stage; 50% of disk capacity is used; the guard regions are located in the middle of each band. (third embodiment)
Figure 8:
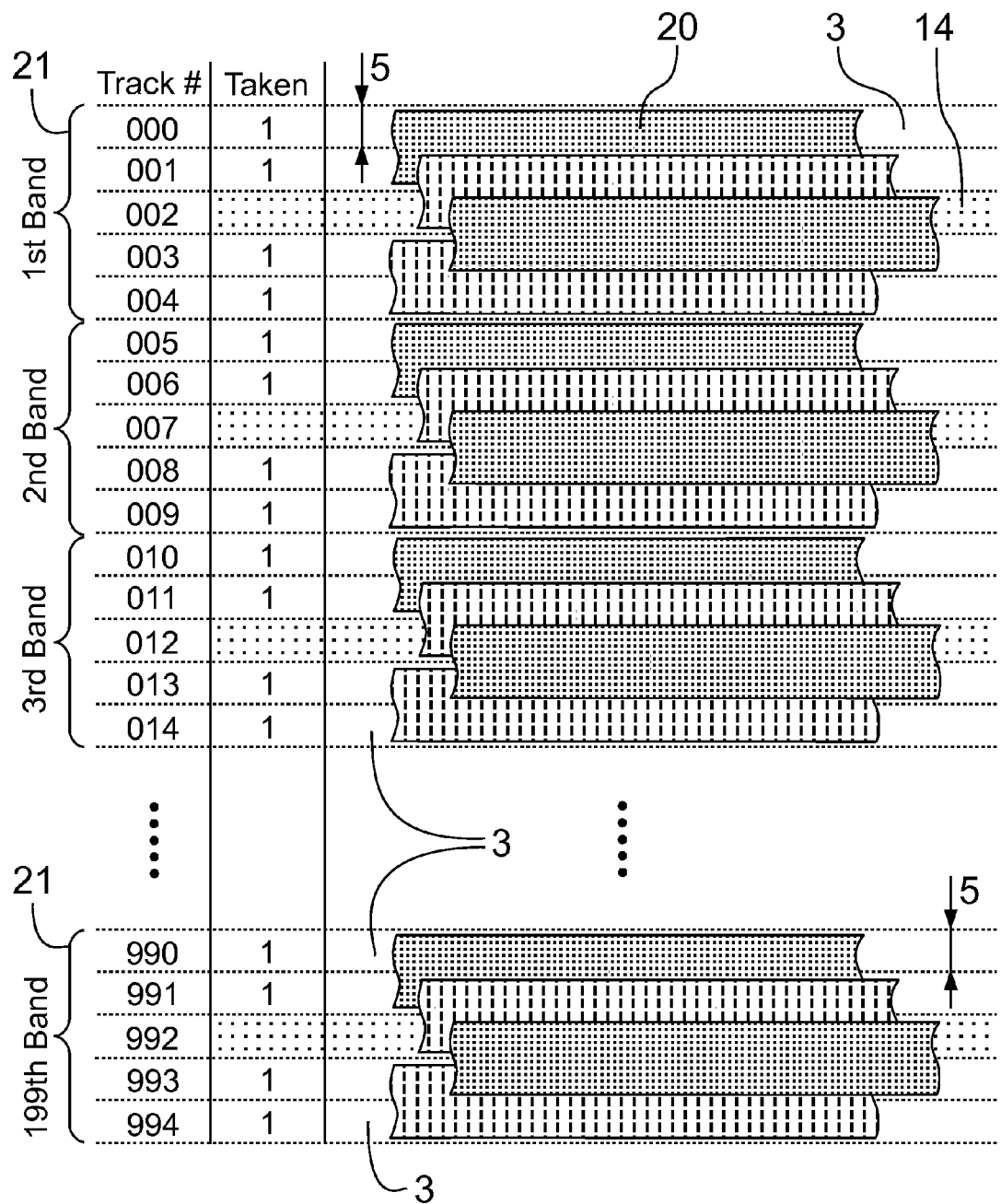
FIG. 8 shows the end of a second filling stage; disk full; the guard regions are located in the middle of each band. (third embodiment)

FIG. 7 and FIG. 8 show a third embodiment. As in the previous examples, a read/write head 8 is used whose write element 16 writes data tracks 20 that are twice as wide as the track width 5. Tracks 3 are grouped into symmetrical bands 21, each comprising four usable tracks 3 and one guard track 14 at the center. In this example, a disk surface 2 incorporates 995 tracks, counted from track #000 to track #994, grouped into 199 bands.

For the sake of clarity and to keep the drawings manageable, each disk surface 2 in this embodiment has a very low track count. It is to be expressly noted that actual embodiments may have much larger track counts. Furthermore, it is pointed out that some parts, regions, or sections of the disk surface 2 may be used or reserved for other purposes. It should also be noted that the drawings represent only one disk surface 2. Further disk surfaces 2, if any, may be filled in the same manner.

The drawings illustrate how the tracks 3 of the SMR hard disk drive 1 can be gradually filled in phases or filling stages. Filling stages are to be understood as an instructive aid for illustrating a typical filling sequence. Furthermore, for the sake of simplicity, it is assumed here that initially the SMR hard disk drive 1 is empty and/or formatted.

FIG. 7 shows a disk surface 2 at the end of the first filling stage. The outer tracks 3 of each band 21 are taken, resulting in a disk surface 2 wherein 50% of available capacity is used. This filling stage may have been achieved as follows.

The host system 9 starts to issue write commands. The new data may be added to track #000 in the 1st band. To write the new data to this track 3, the wide write element 16 is positioned on track pair (#000, #001). Subsequently, new data may be added to track #004: the write element 16 is positioned on track pair (#003, #004). The excess width 18 of the write element 16 is always oriented toward the center of the band 21. As soon as the two outer tracks 3 of the 1st band are filled, the process is continued in the 2nd band: as shown in FIG. 7, a data track 20 has been written to track pair (#005, #006), etc. While continuously filling the SMR hard disk drive 1 with data, the read/write head 8 performs short seeks to nearby tracks 3, that is, the settle-time may dominate.

Depending on the embodiment, a flag for each physical sector 4 or track 3 may be managed by the hard disk controller 10, indicating whether a physical sector 4 or track 3 is taken, i.e., whether the physical sector 4 or track 3 contains valid data. As soon as data are written to a physical sector 4 or track 3, the corresponding flag may be set, as indicated with value "1" in the "Taken" column in FIG. 7. At the end of the first filling stage substantially all "Taken" flags for the outer tracks 3 of the bands 21 may be set to "1", while the "Taken" flags for the inner tracks 3 retain the value "0".

Optionally, depending on the embodiment, the host system 9 may send a command indicating that a particular physical sector 4 or track 3 no longer contains valid data, such as a TRIM command as defined in ATA specifications. Thereupon, the corresponding "Taken" flag may be reset to zero.

In the third embodiment, when filling an empty SMR hard disk drive 1 consisting of several disk surfaces 2, new data may initially be written to a first disk surface 2: track pair (#000, #001), track pair (#003, #004), track pair (#005, #006), etc., until the first disk surface 2 is half-full, as shown in FIG. 7. Only then a switch of the read/write heads 8 to the next, yet empty, disk surface 2 in the disk stack 13 takes place. The second disk surface 2 and all subsequent disk surfaces 2 may be filled in a similar manner until 50% of the entire capacity of the SMR hard disk drive 1 is used.

As long as less than 50% of the capacity is used, that is, less than 50% of all tracks 3 are taken, the written data tracks 20 will not overlap, as shown in FIG. 7. Hence, overwriting a track 3 does not require the system to read, buffer and rewrite any adjacent tracks 3, that is, any data stored on the SMR hard disk drive 1 can be updated without necessitating read-modify-write operations. There is no write amplification.

Below a fill level of 50% the SMR hard disk drive 1 may therefore achieve a performance roughly equivalent to a conventional hard disk drive, even in the case of random write operations. In many typical application scenarios only a portion of the available capacity is used for a long time.

With continued reference to the idealized situation shown in FIG. 7, as soon as data are written to track pair (#993, #994) on the last disk surface 2, the corresponding first filling stage may be concluded. At this point, the read/write heads 8 may switch back to the first disk surface 2. Subsequently, in a second filling stage, the SMR hard disk drive 1 may write data to the two innermost tracks 3 of each band 21, that is, the tracks 3 adjacent to the guard tracks 14. As with the first filling stage, corresponding "Taken" flags may be set to "1" as soon as valid data are written to a physical sector 4 or track 3.

FIG. 8 shows the second filling stage. Here the wide write element 16 may write data tracks 20, inter alia, to track pair (#001, #002) and track pair (#002, #003) in the 1st band. The excess width 18 of the write element 16 is caught by the guard track 14 on track #002. As the contents stored on the guard track 14 are irrelevant, the guard track 14 can be overwritten from both sides. The first disk surface 2 is full as soon as data have been written to track pair (#992, #993), that is, all tracks 3 of the first disk surface 2 are taken, as illustrated in FIG. 8. Depending on the number of disk surfaces 2 in the disk stack 13, the process may be repeated on the remaining disk surfaces 2 until the entire SMR hard disk drive 1 is full.

In order to enable random write operations at any time, when updating or writing data to an outer track 3 of a band 21, it may be necessary to check whether valid data are already located on the adjacent, inner track 3. In such cases, the "Taken" flags for the inner track 3 may be evaluated before writing data. If the corresponding flag of an adjacent inner physical sector 4 or track 3 is set to "1", a read-modify-write operation may be necessary to prevent the wide write element 16 from overwriting valid data. For example, before writing data to track #000, it may be necessary to check whether valid data already exist on the inner, adjacent track #001. If the corresponding "Taken" flag is set to "1", the sector data on track #001 must be read and buffered, and must be rewritten after updating or changing sector data on track #000. Otherwise, if the flag is set to "0", the outer track #000 can be written without read-modify-write by directly positioning the write element 16 on track pair (#000, #001).

With regard to the worst-case scenario of random write operations when the SMR hard disk drive 1 is full, there are two innermost tracks 3 per band 21 that can be directly overwritten at any time, and there are two tracks 3 at the band boundaries that require a read-modify-write operation. Statistically, 50% of the random write operations can be performed immediately, and for the remaining 50%, merely a single track 3 must be buffered via read-modify-write. Consequently, even in a worst-case scenario, the performance of the third embodiment is reasonably competitive with conventional hard disk drives (non-SMR). If 75% of the capacity of the SMR hard disk drive 1 is used, the probability that a random write operation can update existing data without read-modify-write is 66.6%. The lower the fill level, the more favorable the percentage ratio.

The third embodiment and further embodiments are characterized by the feature that newly or recently added data can be altered instantly, that is, without write amplification. This applies regardless of the current fill level of the SMR hard disk drive 1. This feature is based on the special order in which the tracks 3 are written. The order ensures that newly or recently written data tracks 20 are retained at their full width for as long as possible before they are partially overwritten by adjacent data tracks 20. The embodiments therefore take into account that newly or recently added data are generally changed more often than old data.

Figure 9:
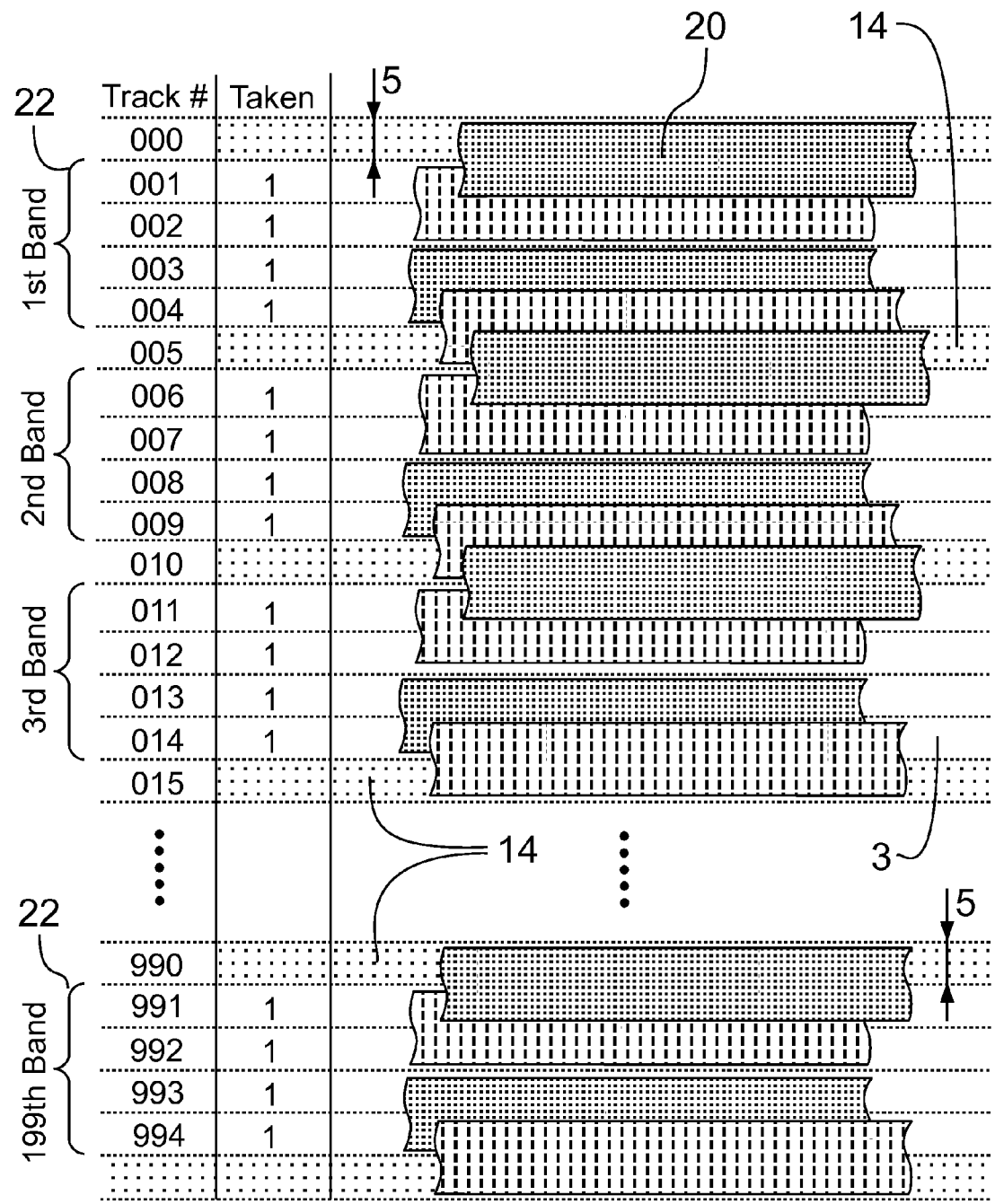
FIG. 9 shows the end of a second filling stage; disk full; the guard regions are located at the band boundaries. (fourth embodiment)

FIG. 9 shows a fourth embodiment, which is similar to the third embodiment except that the overlaps of the data tracks 20 are aligned in the opposite direction. Analogous to the depiction in FIG. 6, the overlapping data tracks 20 diverge in the middle of the bands 22, whereas the guard tracks 14 are located between the bands 22. The two inner-most tracks 3 in each band 22 are written in a first filling stage, whereas the outer tracks 3 in each band 22 are written in a second filling stage. The disk surface 2, as depicted in FIG. 9, is completely filled, that is, all tracks 3 are taken. This corresponds to the situation depicted in FIG. 8 (third embodiment).

The "inverted" arrangement of overlapping data tracks 20, as per FIG. 9, has a comparable performance to the arrangement in the third embodiment and is therefore equally preferable. Further embodiments characterized by an "inverted" arrangement of overlapping data tracks 20 are omitted solely to keep the number of drawings manageable.

Figure 10:
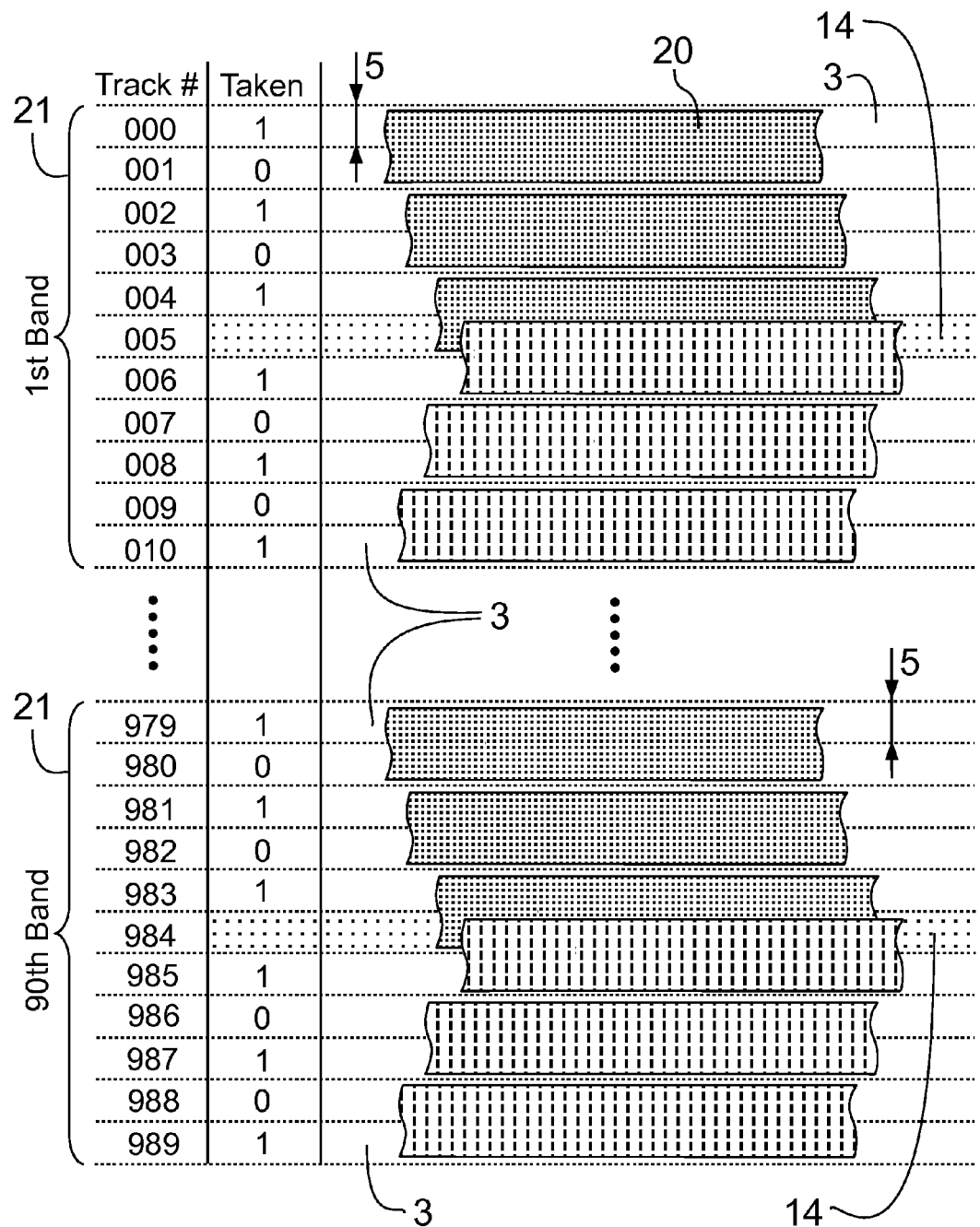
FIG. 10 shows the end of a first filling stage; 60% of disk capacity is used; the guard regions are located in the middle of each band. (fifth embodiment)
Figure 11:
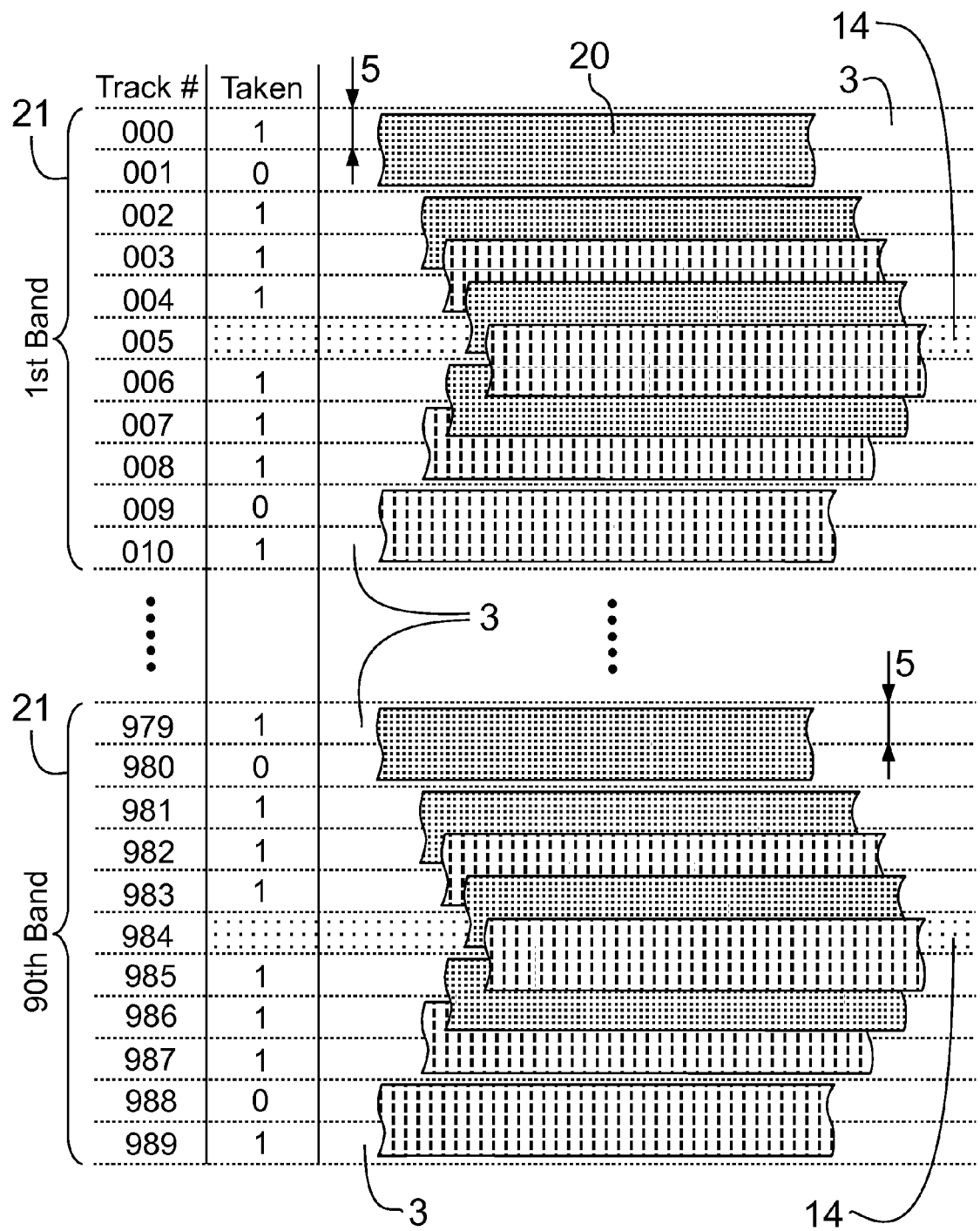
FIG. 11 shows the end of a second filling stage; 80% of disk capacity is used; the guard regions are located in the middle of each band. (fifth embodiment)
Figure 12:
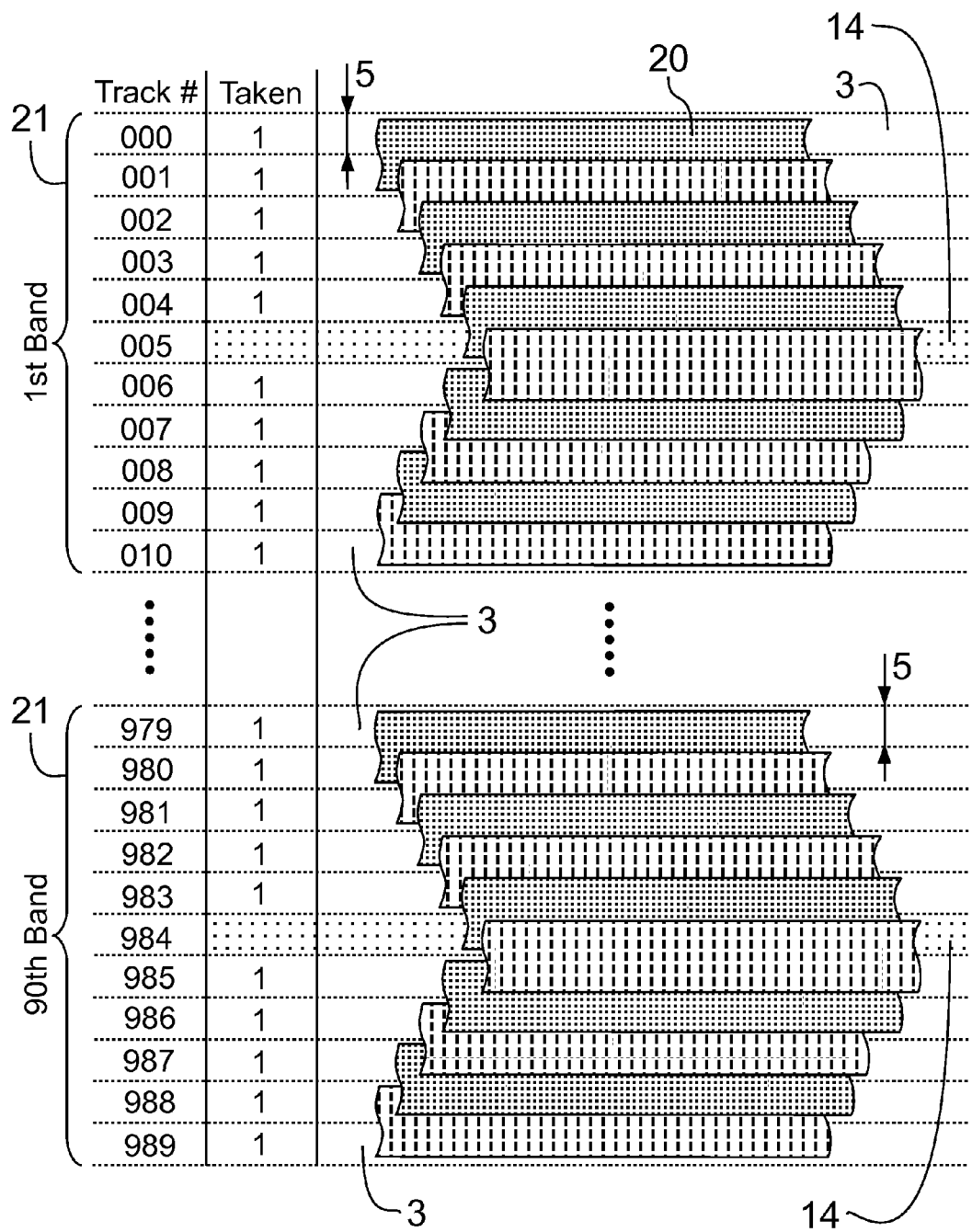
FIG. 12 shows the end of a third filling stage; disk full; the guard regions are located in the middle of each band. (fifth embodiment)

FIG. 10 through FIG. 12 show a fifth embodiment. The effective track width of the write element 16 is twice the track width 5 of the read element 17. Symmetrical bands 21 are used whose guard tracks 14 are located in the middle of the bands 21. Each band 21 comprises eleven tracks 3, ten of which can be used for data storage. In the present example, a disk surface 2 contains 990 tracks, counted from track #000 to track #989, grouped into 90 bands. Whether a physical sector 4 or track 3 contains valid data is indicated in the "Taken" column. In the fifth embodiment, filling an empty SMR hard disk drive 1 takes place in three phases or filling stages, referred to herein as "first filling stage," "second filling stage," and "third filling stage."

FIG. 10 shows a disk surface 2 at the end of the first filling stage, the point reached when 60% of the tracks 3 on each disk surface 2 in the disk stack 13 are used. Six of ten available tracks 3 per band 21 are taken, as indicated in the "Taken" column. It can be seen that data have been written such that the resulting data tracks 20 do no overlap, with the exception of the guard tracks 14. For example, in the 1st band, data may be written to track pair (#000, #001), track pair (#002, #003), and track pair (#004, #005). Since the guard track 14 on track #005 can catch the excess width 18 of the write element 16 from both sides, data tracks 20 can also be written on track pair (#005, #006), track pair (#007, #008), and track pair (#009, #010). While continuously filling the SMR hard disk drive 1 with data, the read/write head 8 performs short seeks to nearby tracks 3, that is, the settle-time may dominate.

Typically, no read-modify-write is required during the first filling stage (i.e., up to a fill level of 60%). Even if existing data are updated (e.g., random write operations) no write amplification may occur, since the data tracks 20 do not overlap. Thus, in the first filling stage, the characteristics and performance of the SMR hard disk drive 1 may correspond to that of a conventional hard disk drive (non-SMR).

When 60% of the tracks 3 on all disk surfaces 2 are taken (six tracks 3 per band 21), the end of the first filling stage is reached. At this point the second filling stage may begin, and the read/write heads 8 may switch back from the last disk surface 2 to the first disk surface 2.

FIG. 11 shows a disk surface 2 at the end of the second filling stage, which is reached when 80% of the tracks 3 on each disk surface 2 in the disk stack 13 are used. Eight of ten available tracks 3 per band 21 are taken, as indicated in the "Taken" column. It can be seen that data have been added to tracks 3 that are chosen in such a way that from the still unused tracks 3 those two tracks 3 are selected per band 21 that are located as close as possible to the guard track 14. This is done to reduce the write amplification. When adding new data, it may be sufficient to perform a read-modify-write operation for a single track 3 (the innermost track 3 adjacent to the guard track 14).

By way of example, with continued reference to FIG. 11, data have been added to track #003 and track #007 in the 1st band. In order to write data to these tracks 3, read-modify-write operations may be required, since the wide write element 16 must write data tracks 20 on track pair (#003, #004) and track pair (#006, #007), the tracks #004 and #006 already being taken.

When 80% of the tracks 3 on all disk surfaces 2 are taken (eight tracks 3 per band 21), the end of the second filling stage is reached. At this point the third and final filling stage may begin, and the read/write heads 8 may switch back from the last disk surface 2 to the first disk surface 2.

FIG. 12 shows the tracks 3 of a full disk surface 2 at the end of the third filling stage. Data are added to the last free tracks 3 in each band 21 (e.g., track #001 and track #009 in the 1st band). This gives rise to increased write amplification, as it may be necessary to carry out read-modify-write operations for three additional tracks 3 when writing data to the remaining free tracks 3. The last 20% of storage capacity of the SMR hard disk drive 1 thus may constitute a reserve capacity that can be used with reduced, but practicable performance.

Figure 13:
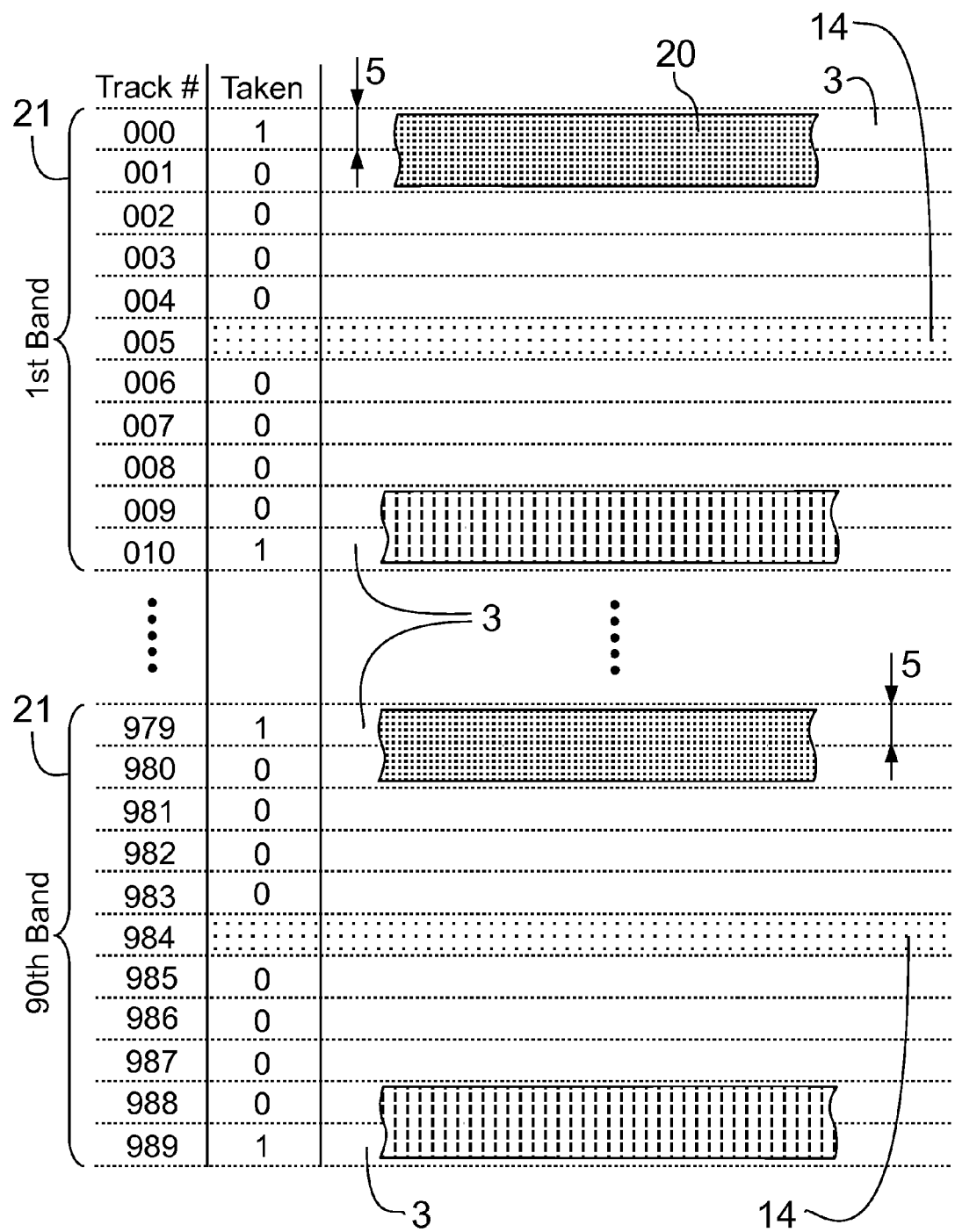
FIG. 13 shows the end of a first filling stage; 20% of disk capacity is used; the guard regions are located in the middle of each band. (sixth embodiment)
Figure 14:
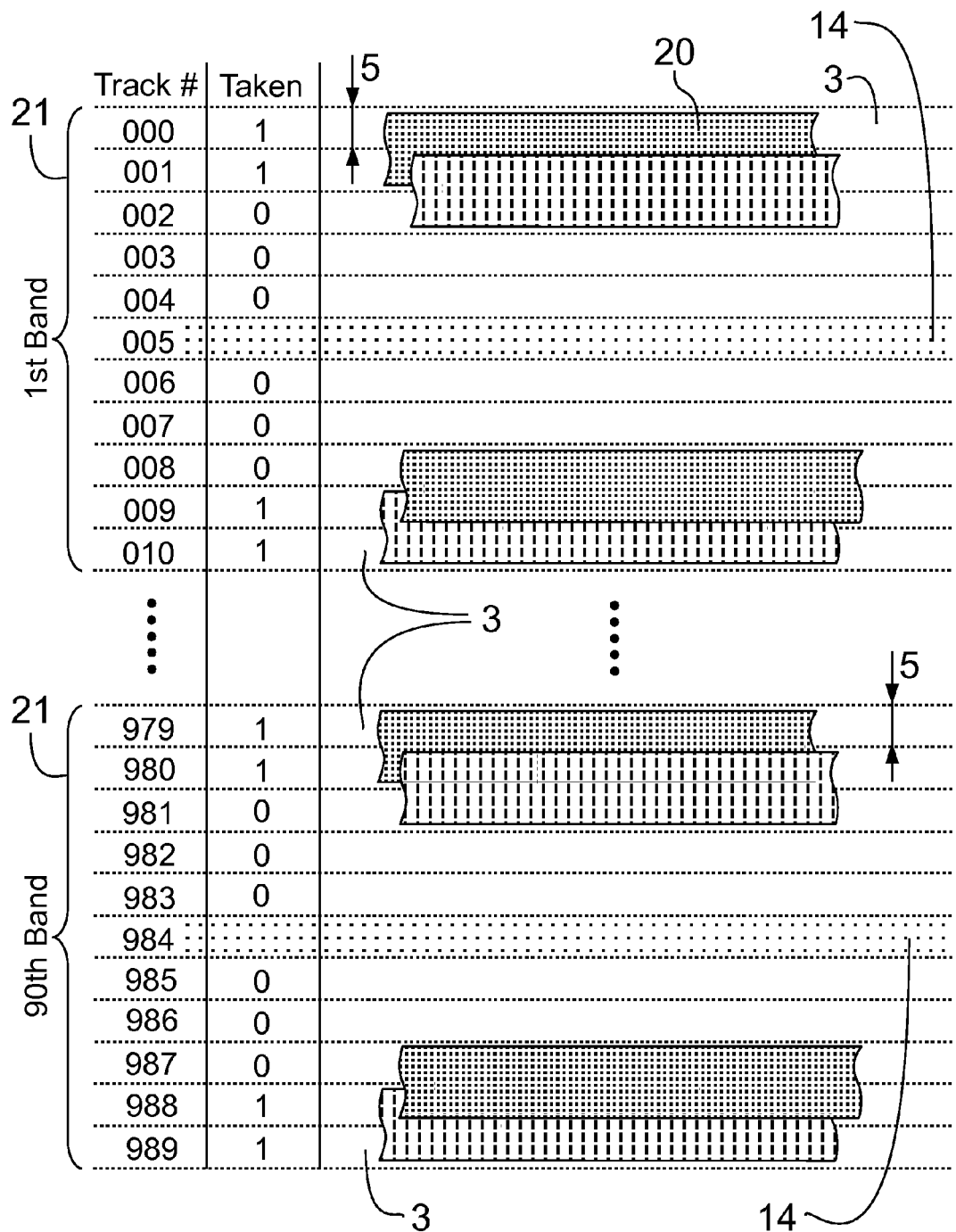
FIG. 14 shows the end of a second filling stage; 40% of disk capacity is used; the guard regions are located in the middle of each band. (sixth embodiment)
Figure 15:
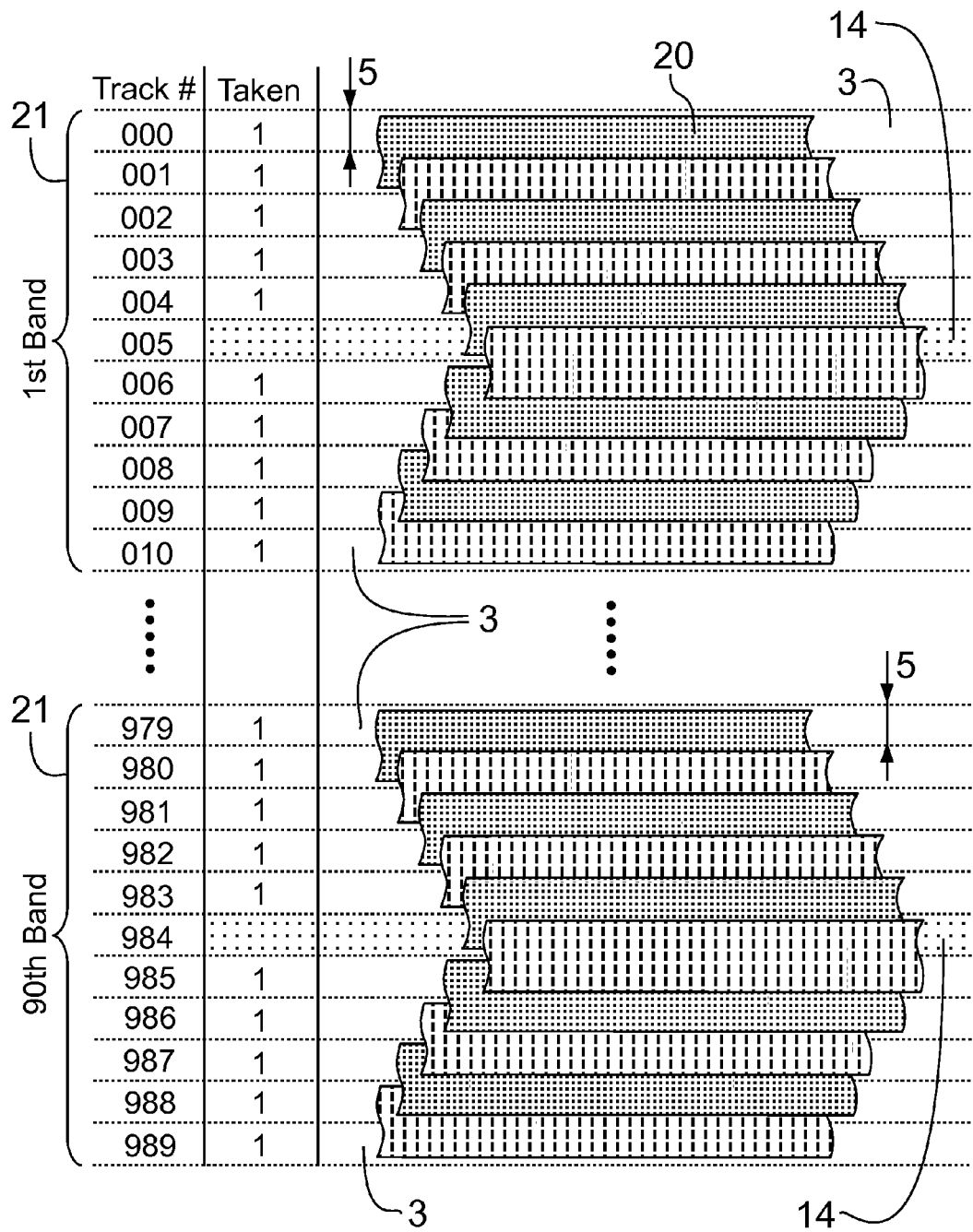
FIG. 15 shows the end of a fifth filling stage; disk full; the guard regions are located in the middle of each band. (sixth embodiment)

FIG. 13 through FIG. 15 show a sixth embodiment, which corresponds to the fifth embodiment with regard to the number of tracks 3, number of bands 21, capacity, and read/write heads 8. However, in contrast to the fifth embodiment, a different strategy, that is, a different order is used to write data to the tracks 3 of the bands 21. For purposes of illustration, an empty SMR hard disk drive 1 is filled in five phases or filling stages, two tracks 3 per band 21 being added in each filling stage.

In the first filling stage, shown in FIG. 13, data are added to the two outer tracks 3 of each band 21. By way of example, data are added to track #000 and track #010 in the 1st band by writing data tracks 20 on track pair (#000, #001) and track pair (#009, #010). The first filling stage may correspond to the first 20% of the hard disk drive capacity. There is no write amplification.

FIG. 14 shows the second filling stage, which may correspond to a fill level between 20% and 40%. Data are added to the inwardly adjacent tracks 3. For example, data may be added to track #001 and track #009 in the 1st band by writing data tracks 20 to track pair (#001, #002) and track pair (#008, #009).

As shown by the occupancy of the bands 21 in FIG. 14, no write amplification occurs when adding new data or when changes are made to the last 20% of newly added data. This is true at every fill level. For example, at a fill level of 30%, the last 20% of newly added data (including such data that have been added during the first filling stage) can be changed right away, without necessitating read-modify-write operations. This can be explained by the fact that at every fill level, there are exactly two tracks 3 per band 21 (thus 20%) that can be directly overwritten at any time. A read-modify-write may be required only when changing older data, in this example, data written at the beginning of the first filling stage.

The third filling stage and the fourth filling stage are not depicted as drawings. In their approach they correspond to the second filling stage as per FIG. 14. In each filling stage data are added to the next inwardly adjacent tracks 3 in the bands 21. For instance, in the third filling stage, data tracks 20 are written on track pair (#002, #003) and track pair (#007, #008) in the 1st band. No write amplification occurs when adding new data or when changes are made to the last 20% of newly added data.

FIG. 15 shows the tracks 3 of a full disk surface 2 at the end of the fifth and final filling stage. Data are added to the tracks 3 adjacent to the guard tracks 14, for example track #004 and track #006 in the 1st band, for which the write element 16 may be positioned on track pair (#004, #005) and track pair (#005, #006), respectively. In the sixth embodiment, updates or changes to the last 20% of newly or recently added data can be written immediately, that is, without read-modify-write, even if the SMR hard disk drive 1 is completely full.

When comparing the fifth and sixth embodiments, those skilled in the art will recognize that the various strategies that can be used to write data to the tracks 3 on the disk surfaces 2 have different advantages and/or disadvantages. Those skilled in the art will therefore choose an embodiment or a variant that is particularly suited to a specific purpose.

For instance, the fifth embodiment may not require any read-modify-write operations up to a fill level of 60%, even in the case of random write operations or when changing existing data. Therefore, one conceivable application scenario would be a database that increases in size slowly and has frequently changing contents.

The sixth embodiment is characterized in that no read-modify-write operations may be required to change any newly or recently added data, even in the case of random write operations. Therefore, one conceivable application scenario would be a file server that stores large amounts of data, while the users typically make changes to newly or recently added files, that is, files pertaining to current topics or issues.

Figure 16:
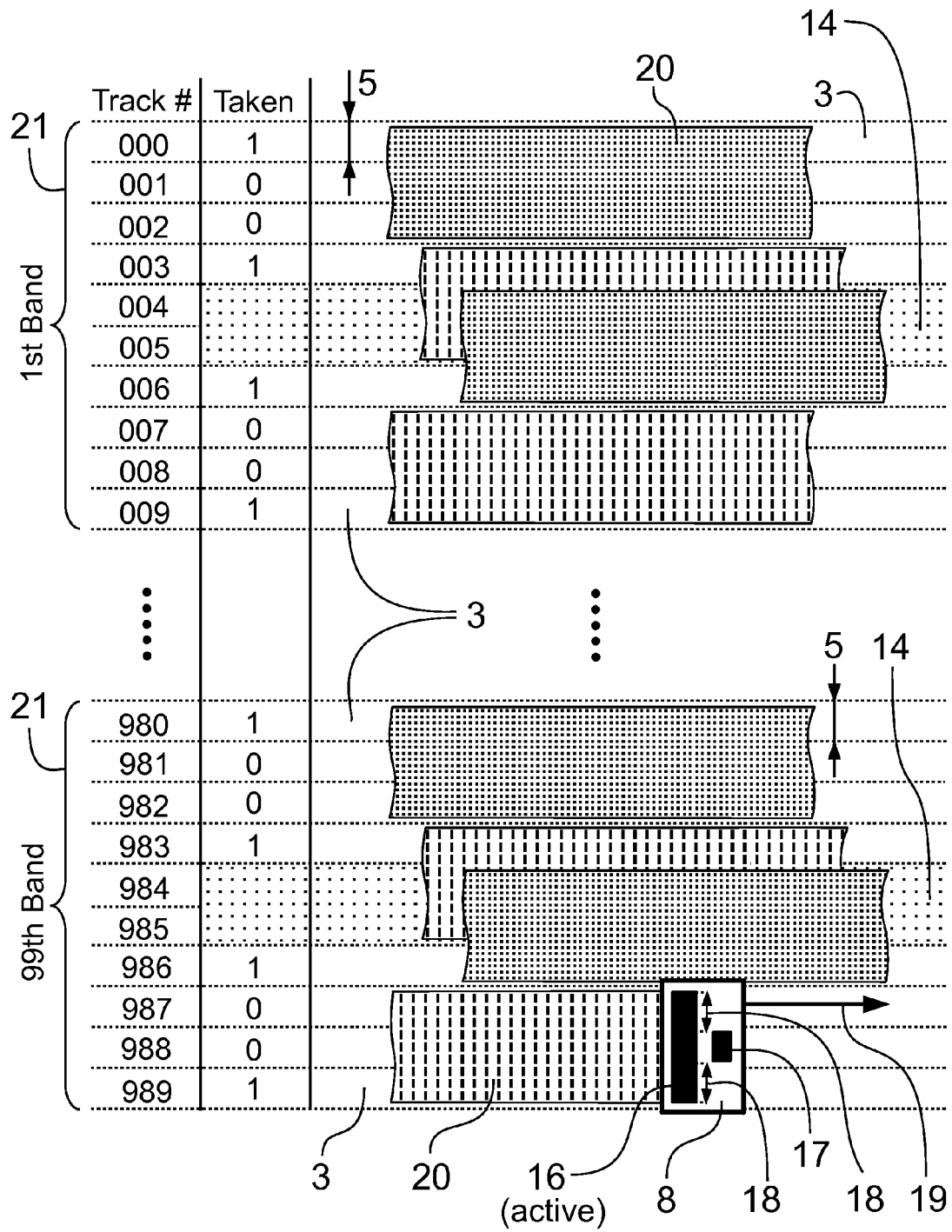
FIG. 16 shows the end of a first filling stage; 50% of disk capacity is used; the guard regions are located in the middle of each band. (seventh embodiment)
Figure 17:
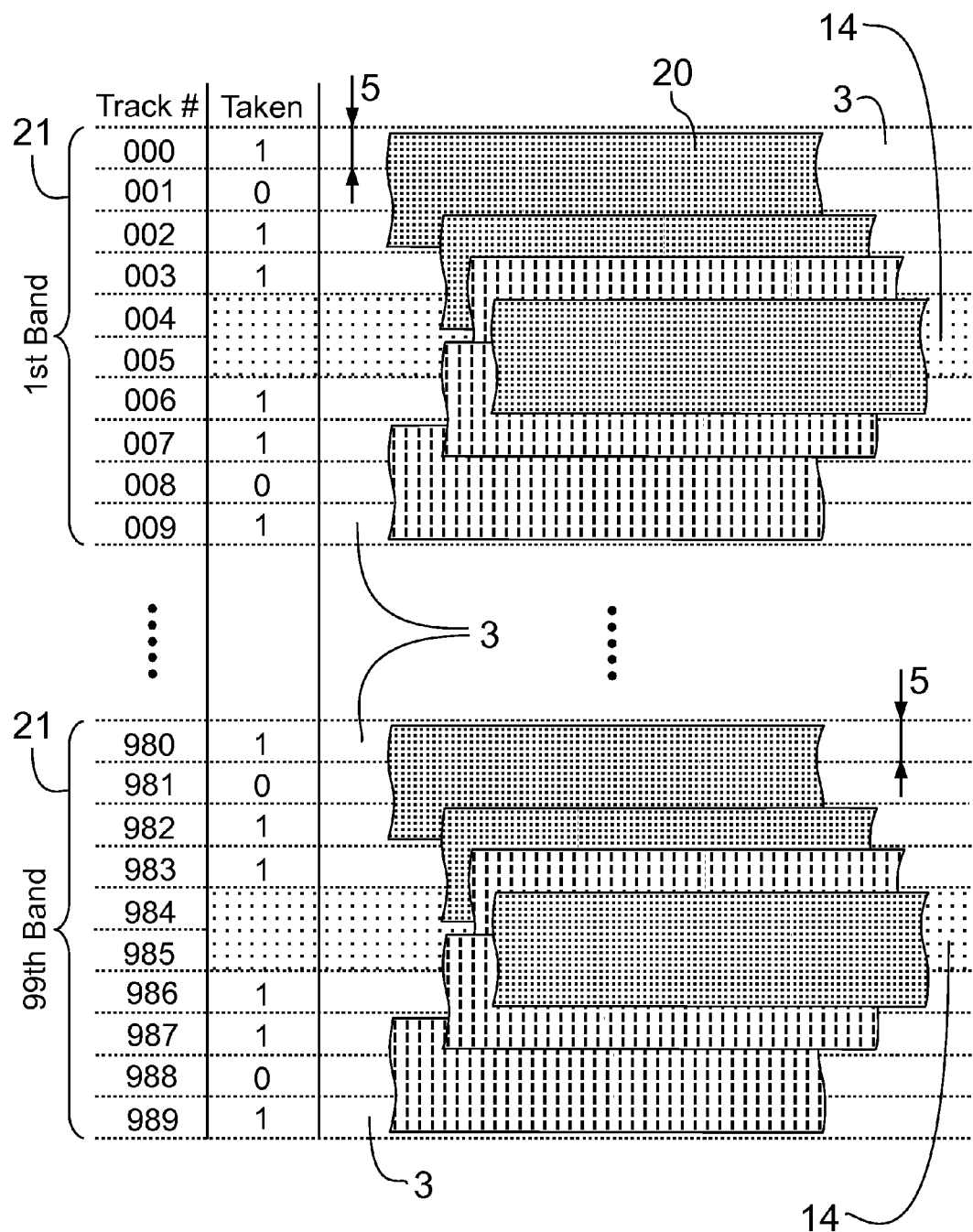
FIG. 17 shows the end of a second filling stage; 75% of disk capacity is used; the guard regions are located in the middle of each band. (seventh embodiment)
Figure 18:
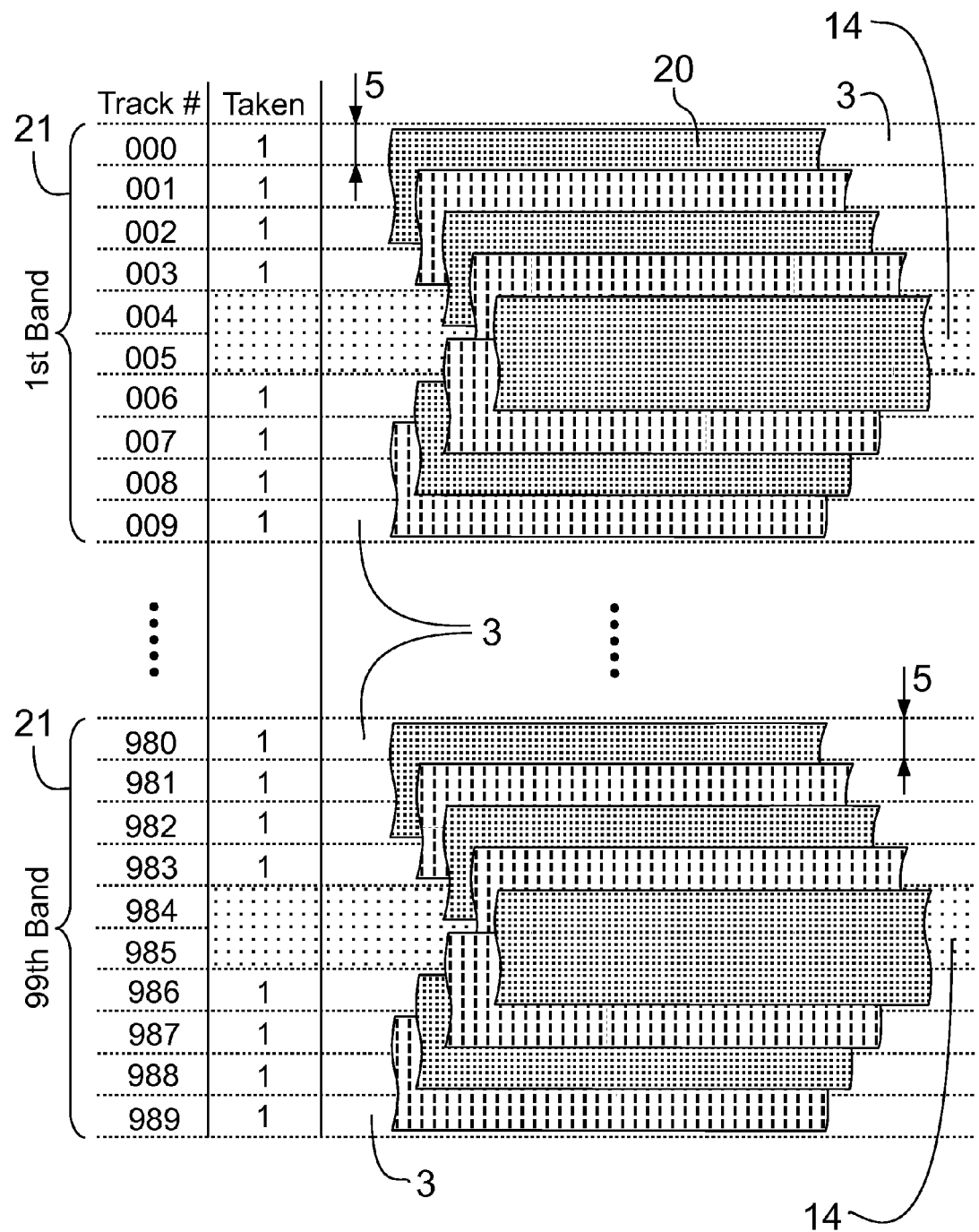
FIG. 18 shows the end of a third filling stage; disk full; the guard regions are located in the middle of each band. (seventh embodiment)

FIG. 16 through FIG. 18 show a seventh embodiment. The effective track width of the write element 16 is three times as wide as the track width 5 of the read element 17, as can be seen from the read/write head 8 depicted in FIG. 16. The excess width 18 of the write element 16, as defined in the present disclosure, is the difference between the effective track width of the write element 16 and the track width 5 of the read element 17. Accordingly, with regard to FIG. 16, the excess width 18 is the sum of the length of the two arrows 18 on both sides of the read element 17.

In this context, the term "excess width 18 of write element 16" is to be interpreted regardless of the position of the read element 17 within the read/write head 8 and regardless of the corresponding arrows 18 depicted in FIG. 16. E.g., the excess width 18 may be located on either sides of the write element 16, depending on whether the write element 16 writes to a track 3 in the upper or lower half of a band 21.

Since the write element 16 writes data tracks 20 of triple track width 5, a guard region 14 that covers a width no less than two tracks 3 is required (at least double track width 5). The seventh embodiment utilizes symmetrical bands 21 that have a guard region 14 in the middle of each band 21. Eight tracks 3 per band 21 may be used for storing data while two tracks 3 per band 21 are required as guard region 14. As illustrated in FIG. 16 through FIG. 18, a disk surface 2 may contain 990 tracks, counted from track #000 to track #989, grouped into 99 bands.

With regard to the order or sequence in which the tracks 3 on a disk surface 2 are written, the seventh embodiment makes use of a strategy similar to that of the fifth embodiment, and may therefore, inter alia, be suitable for files and/or databases whose contents change frequently. For this purpose, filling an empty SMR hard disk drive 1 may be considered as taking place in three phases or filling stages.

FIG. 16 shows a disk surface 2 at the end of the first filling stage, which may be reached at a fill level of 50%. Data are added to four tracks 3 per band 21, for example track #000, track #003, track #006, and track #009 in the 1st band, as indicated by value "1" in the "Taken" column. The written data tracks 20 do not overlap, with the exception of the guard regions 14. That is, the excess width 18 of the write element 16 is caught by empty, adjacent tracks 3 or by the guard region 14. Hence, no read-modify-write operations are required when updating existing data.

FIG. 17 shows the second filling stage, which may correspond to a fill level between 50% and 75%. Data are added to two tracks 3 per band 21, for example, track #002 and track #007 in the 1st band by writing data tracks 20 on the triple sets of tracks (#002, #003, #004) and (#005, #006, #007). Track #003 and track #006, which already contain valid data, are overwritten, necessitating a read-modify-write. Since this read-modify-write involves a single track 3, practicable performance can be achieved up to a fill level of 75%.

FIG. 18 shows the tracks 3 of a full disk surface 2 at the end of the third and final filling stage. Data are added to the last free tracks 3 in the bands 21, for example on track #001 and track #008 in the 1st band. This results in increased write amplification so that the last 25% of storage capacity may be considered reserve capacity that runs with reduced performance.

Those skilled in the art will recognize that there is a wide variety of ways and strategies in regard to the order or sequence in which the tracks 3 on a disk surfaces 2 can be written. Various embodiments may be combined and/or varied. Those skilled in the art will therefore choose a suitable embodiment or variant.

Furthermore, a configuration option may be provided so that users can select or change the strategy, order, or sequence in which tracks 3 are written. This could be done as part of a re-initialization that optimizes the SMR hard disk drive 1 for a specific, or new, purpose. The hard disk controller 10 may also change the strategy adaptively during operation, in order to respond to the characteristics of the written data. E.g., the hard disk controller 10 may determine the dominating task type, such as adding new data to free disk space or changing existing data.

In some disclosed embodiments, when filling a hard disk drive 1 with data, the read/write heads 8 switch to the next disk surface 2 not until data have been added to each band 21, 22 of the present disk surface 2. That is, data are written to a selection of tracks 3 encompassing all bands 21, 22 on a disk surface 2, and only then does a switch to the next disk surface 2 take place. However, in other embodiments the read/write heads 8 may switch between different disk surfaces 2 more frequently, for instance, after each zone. Also, the read/write heads 8 may switch between disk surfaces 2 in a different, or dynamic order. Examples may be found in U.S. Pat. No. 8,699,185 B1, entitled "Disk drive defining guard bands to support zone sequentiality when butterfly writing shingled data tracks," the disclosure of which is hereby incorporated by reference in its entirety.

In further embodiments the hard disk controller 10 may optimize the position of stored data depending on weather the data are changed frequently or seldom. Data that are changed frequently may include, for instance, the file management table of a file system, databases, or any other type of directory, table contents, or index data that are often changed or updated during operation. Rarely changed data may include any type of data that are stored for archival purposes.

Frequently changed data may be stored on tracks 3 adjacent to the guard regions 14 of the symmetrical bands 21, 22, whereas data for archival purposes may be stored farther away from the guard regions 14. In this way, frequently changed data can be updated directly without read-modify-write. Updating archive data may cause write amplification, though, due to the distance to the guard regions 14.

For example, in the case of the first embodiment, as per FIG. 4, frequently changing data may be written to tracks #104 and #106, allowing an instant update without write amplification, and data for archival purposes may be written, inter alia, to tracks #101, #102, #108, and #109. In the case of the second embodiment, as per FIG. 6, frequently changing data may be written to tracks #101 and #108, adjacent to the guard regions 14, and archive data may be stored, inter alia, on tracks #103 through #106.

In the case of the fifth and sixth embodiments, as per FIG. 12 and FIG. 15, frequently changing data may be located, for instance, on tracks #004 and #006 in the 1st band and tracks #983 and #985 in the 90th band, allowing an instant update at any time without read-modify-write. Depending on the required storage space, archive data may be stored on the outer tracks 3 of the bands 21, by way of example, tracks #000 and #010 in the 1st band and tracks #979 and #989 in the 90th band.

Optionally, one or more disk surfaces 2 of the hard disk drive 1 may be divided into areas with overlapping data tracks 20 and areas with conventional, non-overlapping tracks. The areas with conventional, non-overlapping tracks may be used as fast write caches. E.g., while the methods according to the present disclosure may be applied to larger areas with overlapping data tracks 20, conventional caching may be done in smaller areas with non-overlapping tracks. More information about combining overlapping and non-overlapping areas on a disk surface 2 may be found in patent application US2014/0006707 A1, entitled "ICC-NCQ Command Scheduling for Shingle-written Magnetic Recording (SMR) Drives," the disclosure of which is hereby incorporated by reference in its entirety.

As for the embodiments presented in this disclosure, the read/write heads 8 used have write elements 16 twice or three times as wide as their respective read elements 17. However, other embodiments may have different width ratios. Generally speaking, the track width of the write element 16 can be any value greater than the track width 5 of the read element 17.

Furthermore, in some embodiments, the width of a guard region 14 may be equal to the track width 5 or to multiples of the track width 5. Thus, guard regions 14 may fit precisely into the grid of tracks 3. However, in other embodiments, guard regions 14 with different widths may be implemented that are expressly not multiples of the track width 5, but which, for example, are 1.5 times or 2.5 times the width of a track 3. It is to be explicitly noted that the present disclosure is not limited to guard regions 14 consisting of one or two tracks 3. A guard region 14 may have any suitable width. Also, the width of a guard region 14 may be increased to enhance the reliability of stored data.

For illustrative purposes, and to keep the number of depicted tracks 3 and/or physical sectors 4 manageable, all bands 15, 21, 22 or other sections of the disk surfaces 2 shown in the drawings of the present disclosure comprise relatively few tracks 3 and/or physical sectors 4. It is to be expressly noted that actual embodiments may have very large track counts and/or sector counts and that all disclosed methods and devices can be implemented with any number of tracks 3 and/or physical sectors 4.

Each disk surface 2 in the disk stack 13 need not necessarily contain the same number of tracks 3, that is, each disk surface 2 may have its own, individual track count. This shall also apply to the bands 21, 22. Each individual band 21, 22 on a disk surface 2 may comprise a different, e.g., optimized, number of tracks 3.

The embodiments disclosed herein describe the invention based on the example of an SMR hard disk drive 1. All embodiments and further embodiments can, however, also be implemented by means of other data carrier media, which work, by way of example, on magnetic or optical bases. Also, recording data on a data carrier media may be combined with or assisted by other known technologies, such as "Heat-Assisted Magnetic Recording" (HAMR), "Two-Dimensional Magnetic Recording" (TDMR), and/or "Bit Patterned Media" (BPM).

Although the description above contains many specificities, these should not be construed as limiting the scope of the embodiments but as merely providing illustrations of some of several embodiments. Thus, the scope of the embodiments should be determined by the appended claims and their legal equivalents, rather than by the examples given.

What is claimed is:

1. A method for reducing write amplification on a data carrier surface with overlapping data tracks, comprising:
   a) writing overlapping data tracks on said data carrier surface, establishing a plurality of symmetrical bands with overlaps in opposite radial directions essentially between the middle of each symmetrical band and the band boundaries, wherein associated guard regions are located essentially in the middle of each symmetrical band, or at the band boundaries, wherein the excess width of data tracks, written on both tracks adjacent to each guard region, is caught by said guard regions from both sides,
   b) maintaining the number of taken or empty tracks on both sides of each symmetrical band substantially equal at every fill level of each symmetrical band.

2. The method of claim 1, further comprising symmetrical bands whose associated guard regions are located in the middle or near the middle of each symmetrical band, both tracks adjacent to each guard region being written such that the excess width of a write element is caught by said guard region from both sides.

3. The method of claim 2, wherein overlapping data tracks, written by said write element, converge from both outer boundaries of each symmetrical band inward, toward said guard regions, establishing overlaps in opposite radial directions within each symmetrical band.

4. The method of claim 2, further comprising:
   a) writing data substantially to the two outermost tracks on both sides of each symmetrical band, essentially in a first filling stage,
   b) writing data substantially to the next inwardly adjacent tracks on both sides of each symmetrical band, essentially in a second filling stage.

5. The method of claim 4, further comprising writing data substantially to the two innermost tracks adjacent to the guard region of each symmetrical band, essentially in a final filling stage.

6. The method of claim 1, further comprising at least two adjacent symmetrical bands whose shared guard region is located at the common boundary of said symmetrical bands, the tracks adjacent to said common boundary being written such that the excess width of a write element is caught by said shared guard region from both sides.

7. The method of claim 6, wherein overlapping data tracks, written by said write element, diverge from a location in the middle or near the middle of each symmetrical band outward, toward said shared guard regions, establishing overlaps in opposite radial directions within each symmetrical band.

8. The method of claim 6, further comprising:
   a) writing data substantially to the two innermost tracks in the middle of each symmetrical band, essentially in a first filling stage,
   b) writing data substantially to the next outwardly adjacent tracks on both sides of each symmetrical band, essentially in a second filling stage.

9. The method of claim 8, further comprising writing data substantially to the two outermost tracks on both sides of each symmetrical band, essentially in a final filling stage, said outermost tracks being adjacent to the shared guard regions.

10. The method of claim 1, further comprising:
    a) writing data substantially to every second, third, or n-th track on both sides of each symmetrical band, essentially in a first filling stage, where n is a natural number greater than three,
    b) writing data substantially to all remaining, empty tracks of each symmetrical band, essentially in at least one subsequent filling stage.

11. The method of claim 1, further comprising writing frequently changing data to tracks adjacent to said guard regions and/or writing archive data to tracks that have an increased distance to said guard regions within each symmetrical band.

12. The method of claim 1, wherein:
    a) said data carrier surface is a disk surface of a hard disk drive that operates according to the shingled magnetic recording methodology,
    b) physical sectors on said tracks are assigned and/or remapped by means of a logical block address mapping technique.

13. A storage device optimized for low write amplification, comprising:
    a) at least one data carrier surface,
    b) at least one write element whose data track width exceeds the track width of a read element by an excess width,
    c) a plurality of symmetrical bands each comprising overlapping data tracks, written by said write element on said data carrier surface with overlaps in opposite radial directions essentially between the middle of each symmetrical band and the band boundaries, wherein associated guard regions are located essentially in the middle of each symmetrical band, or at the band boundaries, wherein the excess width of data tracks, written on both tracks adjacent to each guard region, is caught by said guard regions from both sides,
    d) a control unit configured to maintain the number of taken or empty tracks on both sides of each symmetrical band substantially equal at every fill level of each symmetrical band.

14. The storage device of claim 13, further comprising symmetrical bands whose associated guard regions are located in the middle or near the middle of each symmetrical band, both tracks adjacent to each guard region being written such that the excess width of said write element is caught by said guard region from both sides.

15. The storage device of claim 14, wherein overlapping data tracks, written by said write element, converge from both outer boundaries of each symmetrical band inward, toward said guard regions, establishing overlaps in opposite radial directions within each symmetrical band.

16. The storage device of claim 14, wherein said control unit is configured to:

a) add data substantially to the two outermost tracks on both sides of each symmetrical band, essentially in a first filling stage,
b) add data substantially to the next inwardly adjacent tracks on both sides of each symmetrical band, essentially in a second filling stage.

17. The storage device of claim 13, further comprising at least two adjacent symmetrical bands whose shared guard region is located at the common boundary of said symmetrical bands, the tracks adjacent to said common boundary being written such that the excess width of said write element is caught by said shared guard region from both sides.

18. The storage device of claim 17, wherein overlapping data tracks, written by said write element, diverge from a location in the middle or near the middle of each symmetrical band outward, toward said shared guard regions, establishing overlaps in opposite radial directions within each symmetrical band.

19. The storage device of claim 17, wherein said control unit is configured to:

a) add data substantially to the two innermost tracks in the middle of each symmetrical band, essentially in a first filling stage,
b) add data substantially to the next outwardly adjacent tracks on both sides of each symmetrical band, essentially in a second filling stage.

20. The storage device of claim 13, wherein:

a) said storage device is a hard disk drive that operates according to the shingled magnetic recording methodology,
b) said data carrier surface is a disk surface of said hard disk drive,
c) said control unit is a hard disk controller of said hard disk drive,
d) said control unit is configured to assign and/or remap physical sectors on said tracks by means of a logical block address mapping technique.

* * * * *